US011448113B2

(12) United States Patent
Sharma et al.

(10) Patent No.: US 11,448,113 B2
(45) Date of Patent: Sep. 20, 2022

(54) FUEL ANALYSIS SYSTEMS AND METHODS

(71) Applicant: Cummins Emission Solutions Inc., Columbus, IN (US)

(72) Inventors: Gautam Sharma, Columbus, IN (US); Deepak Joy Frank, Columbus, IN (US); James Hyungsuk Kang, Wuhan (CN); Abhijeet Nande, Floral Park, NY (US); Jinqian Gong, Columbus, IN (US); Farshad Farid, Cranberry Township, PA (US); Changsheng Su, Columbus, IN (US); Bryon D. Staebler, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/617,815

(22) PCT Filed: Jun. 10, 2019

(86) PCT No.: PCT/CN2019/090473
§ 371 (c)(1),
(2) Date: Dec. 9, 2021

(87) PCT Pub. No.: WO2020/248087
PCT Pub. Date: Dec. 17, 2020

(65) Prior Publication Data
US 2022/0213829 A1    Jul. 7, 2022

(51) Int. Cl.
*F01N 11/00* (2006.01)
*F01N 13/00* (2010.01)
(Continued)

(52) U.S. Cl.
CPC .............. *F01N 11/002* (2013.01); *B60Q 9/00* (2013.01); *F01N 13/008* (2013.01);
(Continued)

(58) Field of Classification Search
CPC .... F01N 11/002; F01N 13/008; F01N 13/009; F01N 3/2066; F01N 2550/02;
(Continued)

(56) References Cited

U.S. PATENT DOCUMENTS 6,041,591 A * 3/2000 Kaneko ............... F02D 41/1446
60/284
6,212,879 B1 * 4/2001 Nishimura .......... F02D 41/0255
60/284
(Continued)

FOREIGN PATENT DOCUMENTS

CN 103277177 A 9/2013
CN 104234802 A 12/2014
(Continued)

OTHER PUBLICATIONS

International Search Report issued for PCT Application No. PCT/CN2019/090473, dated Mar. 17, 2020, 4 pages.
(Continued)

*Primary Examiner* — Matthew T Largi
(74) *Attorney, Agent, or Firm* — Foley & Lardner LLP

(57) ABSTRACT

A vehicle system (100) includes a conversion catalyst (116), a temperature sensor (156), an indication device (142), and an exhaust gas aftertreatment system controller (132). The conversion catalyst (116) is configured to receive exhaust gas. The temperature sensor (156) is configured to sense a conversion catalyst temperature of the conversion catalyst (116). The indication device (142) is operable between a static state and an impure fuel alarm state. The exhaust gas aftertreatment system controller (132) is configured to receive the conversion catalyst temperature from the temperature sensor (156). The exhaust gas aftertreatment system controller (132) is also configured to compare the conversion catalyst temperature to a conversion catalyst temperature lower threshold. The exhaust gas aftertreatment system
(Continued)

controller (132) is also configured to compare the conversion catalyst temperature to a conversion catalyst temperature upper threshold.

20 Claims, 17 Drawing Sheets

(51) Int. Cl.
  B60Q 9/00 (2006.01)
  G08B 21/18 (2006.01)
  F01N 3/20 (2006.01)
(52) U.S. Cl.
  CPC ......... F01N 13/009 (2014.06); G08B 21/182 (2013.01); *F01N 3/2066* (2013.01); *F01N 2550/02* (2013.01); *F01N 2560/026* (2013.01); *F01N 2610/1406* (2013.01); *F01N 2610/1453* (2013.01)
(58) Field of Classification Search
  CPC ....... F01N 2560/026; F01N 2610/1406; F01N 2610/1453
  See application file for complete search history.

(56) References Cited

U.S. PATENT DOCUMENTS

| | | | | |
|---|---|---|---|---|
| 2007/0289287 | A1* | 12/2007 | Tahara | F01N 9/002 60/297 |
| 2008/0016853 | A1* | 1/2008 | Zhang | F01N 3/035 60/285 |
| 2009/0223499 | A1* | 9/2009 | Rosel | F02D 41/1441 60/276 |
| 2011/0170102 | A1* | 7/2011 | Janssen | G01M 15/108 356/438 |
| 2014/0007559 | A1* | 1/2014 | Janssen | F01N 11/00 60/276 |
| 2015/0101313 | A1 | 4/2015 | Mitchell et al. | |
| 2015/0176512 | A1 | 6/2015 | Smith et al. | |
| 2016/0108791 | A1 | 4/2016 | Charbonnel et al. | |
| 2019/0101033 | A1* | 4/2019 | Yoda | B01D 53/9422 |

FOREIGN PATENT DOCUMENTS

| | | | |
|---|---|---|---|
| CN | 104271909 A | | 1/2015 |
| CN | 108425730 A | | 8/2018 |
| CN | 109424398 A | | 3/2019 |
| CN | 109707494 A | * | 5/2019 |
| DE | 11 2007 001 723 B4 | | 6/2009 |
| EP | 3 246 540 B1 | | 11/2017 |
| JP | 5028453 B2 | | 6/2012 |
| SE | 1451242 A1 | | 4/2016 |
| WO | WO-2017/117103 | | 7/2017 |

OTHER PUBLICATIONS

Written Opinion issued for PCT Application No. PCT/CN2019/090473, dated Mar. 17, 2020, 4 pages.

First Office Action issued for Indian Patent Application No. 202147054452 dated Feb. 2, 2022, 7 pages.

Office Action issued for German Patent Application No. DE 112019007436.9 dated Feb. 1, 2022, 5 pages.

* cited by examiner

FUEL ANALYSIS SYSTEMS AND METHODS

CROSS-REFERENCE TO RELATED APPLICATION

The present application is a National Stage of PCT Application No. PCT/CN2019/090473, filed Jun. 10, 2019. The contents of this application are hereby incorporated by reference in their entirety.

TECHNICAL FIELD

The present application relates generally to fuel analysis systems and methods.

BACKGROUND

For internal combustion engines, such as diesel engines, nitrogen oxide ($NO_x$) compounds may be emitted in exhaust. It may be desirable to reduce $NO_x$ emissions to, for example, comply with environmental regulations. To reduce $NO_x$ emissions, a reductant may be dosed into the exhaust by a dosing system and within an aftertreatment system. The reductant cooperates with a catalyst to facilitate conversion of a portion of the exhaust into non-$NO_x$ emissions, such as nitrogen ($N_2$), carbon dioxide ($CO_2$), and water ($H_2O$), thereby reducing $NO_x$ emissions.

In some applications, impure fuel, such as fuel containing sulfur, may be consumed by the internal combustion engine. In such applications, the exhaust may contain atypical byproducts. Over time, these atypical byproducts can accumulate on the catalyst. When enough atypical byproducts have accumulated on the catalyst, the catalyst can become less desirable.

SUMMARY

In one embodiment, a vehicle system includes a conversion catalyst, a temperature sensor, an indication device, and an exhaust gas aftertreatment system controller. The conversion catalyst is configured to receive exhaust gas. The temperature sensor is configured to sense a conversion catalyst temperature of the conversion catalyst. The indication device is operable between a static state and an impure fuel alarm state. The exhaust gas aftertreatment system controller is configured to receive the conversion catalyst temperature from the temperature sensor. The exhaust gas aftertreatment system controller is also configured to compare the conversion catalyst temperature to a conversion catalyst temperature lower threshold. The exhaust gas aftertreatment system controller is also configured to compare the conversion catalyst temperature to a conversion catalyst temperature upper threshold. The exhaust gas aftertreatment system controller is also configured to compare the conversion catalyst temperature to a conversion catalyst temperature middle threshold. The exhaust gas aftertreatment system controller is also configured to increase a first bucket counter in response to determining that the conversion catalyst temperature is less than the conversion catalyst temperature middle threshold. The exhaust gas aftertreatment system controller is also configured to increase a second bucket counter in response to determining that the conversion catalyst temperature is not less than the conversion catalyst temperature middle threshold. The exhaust gas aftertreatment system controller is also configured to communicate a first signal to the indication device based on at least a calculation using the first bucket counter and the second bucket counter.

In another embodiment, an exhaust gas aftertreatment system controller for a vehicle system having a conversion catalyst, an oxidation catalyst, and an indication device is configured to receive a conversion catalyst temperature associated with the conversion catalyst. The exhaust gas aftertreatment system controller is also configured to compare the conversion catalyst temperature to a conversion catalyst temperature lower threshold. The exhaust gas aftertreatment system controller is also configured to compare the conversion catalyst temperature to a conversion catalyst temperature upper threshold. The exhaust gas aftertreatment system controller is also configured to compare the conversion catalyst temperature to a conversion catalyst temperature middle threshold. The exhaust gas aftertreatment system controller is also configured to increase a first bucket counter in response to determining that the conversion catalyst temperature is less than the conversion catalyst temperature middle threshold. The exhaust gas aftertreatment system controller is also configured to increase a second bucket counter in response to determining that the conversion catalyst temperature is equal to or greater than the conversion catalyst temperature middle threshold. The exhaust gas aftertreatment system controller is also configured to communicate a first signal to the indication device based on at least a calculation using the first bucket counter and the second bucket counter In yet another embodiment, a method implemented with an indication device includes receiving an upstream $NO_x$ amount. The method also includes receiving a downstream $NO_x$ amount. The method also includes determining a conversion efficiency based on the upstream $NO_x$ amount and the downstream $NO_x$ amount. The method also includes increase a first bucket total conversion efficiency by the conversion efficiency. The method also includes increase a second bucket total conversion efficiency by the conversion efficiency. The method also includes comparing a first bucket counter to a first bucket counter threshold. The method also includes comparing a second bucket counter to a second bucket counter threshold in response to the first bucket counter not being less than the first bucket counter threshold. The method also includes determining an average first bucket conversion efficiency in response to the second bucket counter not being less than the second bucket counter threshold. The method also includes comparing the average first bucket conversion efficiency to a first bucket conversion efficiency threshold. The method also includes determining an average second bucket conversion efficiency in response to the average first bucket conversion efficiency being greater than the first bucket conversion efficiency threshold. The method also includes comparing the average second bucket conversion efficiency to a second bucket conversion efficiency threshold. The method also includes causing the indication device to be in a static state in response to determining that the average second bucket conversion efficiency is greater than the second bucket conversion efficiency threshold.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
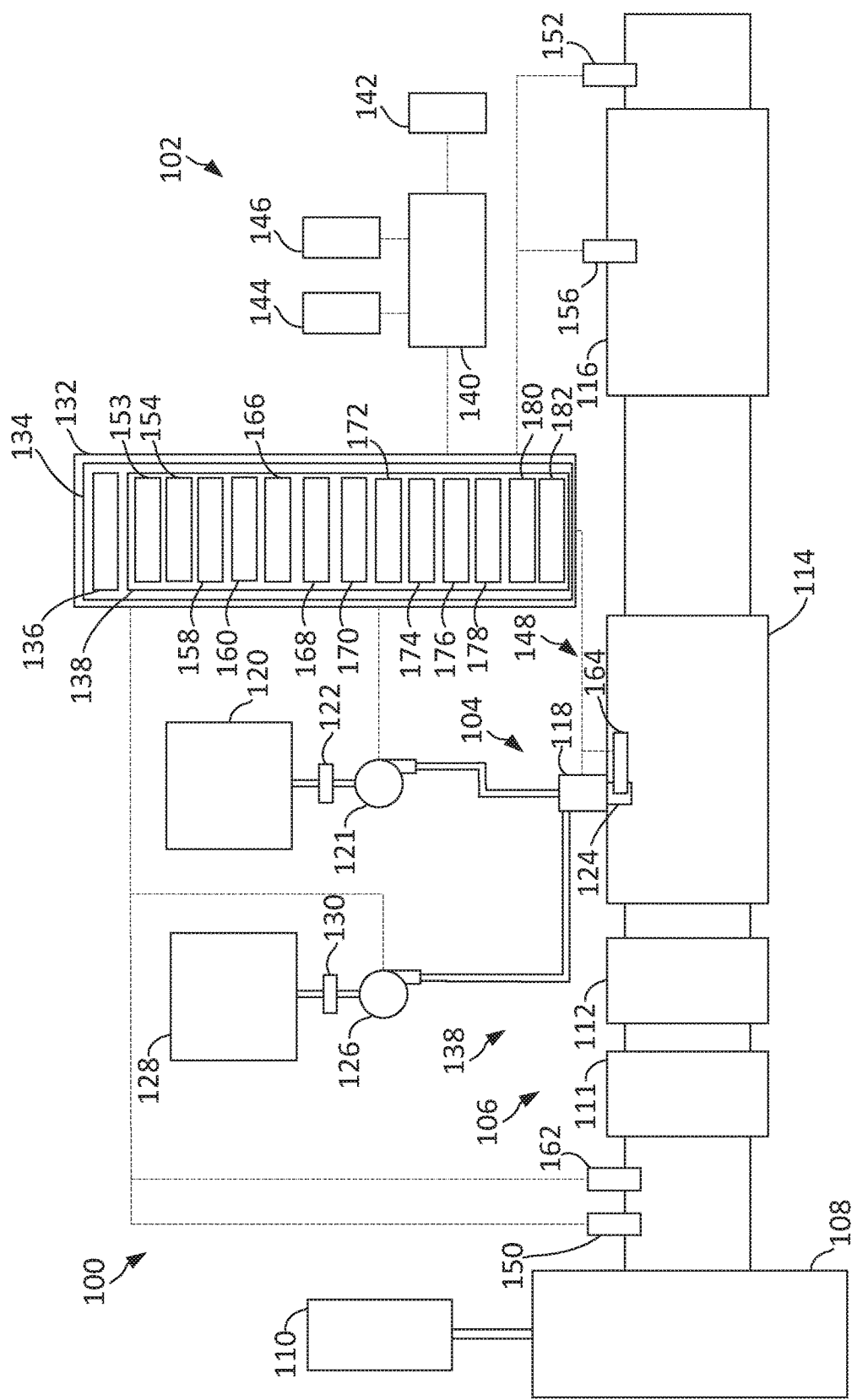
FIG. 1 is a schematic block diagram of an example vehicle system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses for analyzing fuel, such as fuel used by an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas. Depending on the fuel consumed by an internal combustion engine, the exhaust gas can contain different byproducts. In some situations, fuel that has an elevated sulfur content may be consumed by an internal combustion engine. When the sulfur content of fuel is above a threshold, the fuel is impure and the exhaust gas can contain atypical byproducts.

The atypical byproducts can have detrimental impacts on components of an aftertreatment system which receives the exhaust gas. In some situations, the atypical byproducts can cause deactivation of a diesel oxidation catalyst and/or a selective catalytic reduction catalyst. As a result of these deactivations, the aftertreatment system may incorrectly indicate that the diesel oxidation catalyst and/or the selective catalytic reduction catalyst needs to be regenerated. Regenerating the diesel oxidation catalyst and/or the selective catalytic reduction catalyst requires an increase in fuel consumption in order to raise the temperature of the exhaust gases so as to activate the diesel oxidation catalyst and/or the selective catalytic reduction catalyst. As a result, the atypical byproducts can cause an increase in fuel consumption that could be eliminated if the exhaust gas did not contain atypical byproducts.

Furthermore, the atypical byproducts can cause accelerated aging of the diesel oxidation catalyst and/or the selective catalytic reduction catalyst. As a result, more frequent servicing and/or replacement (e.g., via a warranty claim, etc.) of the diesel oxidation catalyst and/or the selective catalytic reduction catalyst may be necessary because of the atypical byproducts. As the diesel oxidation catalyst and/or the selective catalytic reduction catalyst age, the ability of an aftertreatment system to remove $NO_x$ emissions from the exhaust gas may be decreased.

Additionally, the atypical byproducts can cause face plugging of the diesel oxidation catalyst and/or the selective catalytic reduction catalyst. As a result, back pressure on an internal combustion engine can be increased. Increased backpressure can cause the internal combustion engine to operate inefficiently and undesirably.

The consumption of impure fuel by an internal combustion engine can generate atypical byproducts which negatively impact the desirability of the internal combustion engine and an aftertreatment associated therewith. Furthermore, the emission of atypical products from an aftertreatment system (e.g., to atmosphere, etc.) can be undesirable.

Implementations herein are directed to a vehicle system that includes an internal combustion engine and a fuel analysis system which is capable of determining when the internal combustion engine is consuming fuel that is impure. The fuel analysis system performs a fuel analysis process which, in an iterative fashion, receives a temperature of the conversion catalyst, determines whether a sample at that temperature has previously been stored, determines if enough samples in two temperature buckets have been obtained, and then receives an amount of $NO_x$ upstream of the oxidation catalyst and an amount of $NO_x$ downstream of the conversion catalyst, determines a conversion efficiency based on the amount of $NO_x$ upstream of the oxidation catalyst and the amount of $NO_x$ downstream of the conversion catalyst, and uses the conversion efficiency to indicate that the system is operating in a static state, an impure fuel alarm state, or an age alarm state.

Through these features, implementations described herein are capable of alerting a user as to the use of impure fuel and the aging of a catalyst beyond a desirable amount. As a result, implementations described herein are capable of reducing costs associated with warranty servicing and/or replacements which may be performed when impure fuel is consumed by an internal combustion engine.

II. Overview of Vehicle System

FIG. 1 illustrates an example vehicle system 100. The vehicle system 100 includes an exhaust gas aftertreatment system 102 having a reductant delivery system 104 for an exhaust gas conduit system 106. The vehicle system 100 also includes an internal combustion engine 108 (e.g., diesel internal combustion engine, diesel hybrid internal combustion engine, gasoline internal combustion engine, petrol internal combustion engine, liquid propane internal combustion engine, etc.) which produces exhaust gas that is received by the exhaust gas aftertreatment system 102. The internal combustion engine 108 receives fuel (e.g., diesel fuel, gasoline, liquid propane, etc.) from a fuel tank 110 (e.g., reservoir, etc.). The fuel tank 110 is configured to be replenished (e.g., by a user, etc.).

The exhaust gas aftertreatment system 102 also includes an oxidation catalyst 111 (e.g., a diesel oxidation catalyst (DOC)). The oxidation catalyst 111 is configured to (e.g., structured to, able to, etc.) promote oxidation of hydrocarbons and/or carbon monoxide in exhaust gas produced by the internal combustion engine 108 and flowing in the exhaust gas conduit system 106.

The exhaust gas aftertreatment system 102 also includes a particulate filter 112 (e.g., a diesel particulate filter (DPF), etc.). The particulate filter 112 is configured to remove particulate matter, such as soot, from the exhaust gas provided by the oxidation catalyst 111. The particulate filter 112 includes an inlet, where the exhaust gas is received, and an outlet, where the exhaust gas exits after having particulate matter substantially filtered from the exhaust gas and/or converting the particulate matter into carbon dioxide. In some implementations, the particulate filter 112 may be omitted.

The exhaust gas aftertreatment system 102 also includes a decomposition chamber 114 (e.g., reactor, reactor pipe, etc.). The decomposition chamber 114 is configured to convert a reductant into ammonia. The reductant may be, for example, urea, diesel exhaust fluid (DEF), Adblue®, a urea water solution (UWS), an aqueous urea solution (AUS) (e.g., AUS32, etc.), and other similar fluids. The decomposition chamber 114 includes an inlet in fluid communication with the particulate filter 112 to receive the exhaust gas containing $NO_x$ emissions and an outlet for the exhaust gas, $NO_x$ emissions, ammonia, and/or reductant to flow from the decomposition chamber 114.

The exhaust gas aftertreatment system 102 also includes a conversion catalyst 116 (e.g., a selective catalytic reduction (SCR) catalyst, a copper-zeolite SCR catalyst, etc.). The conversion catalyst 116 is configured to assist in the reduction of $NO_x$ emissions by accelerating a $NO_x$ reduction process between the ammonia and the $NO_x$ of the exhaust gas into diatomic nitrogen, water, and/or carbon dioxide. The conversion catalyst 116 includes an inlet in fluid communication with the decomposition chamber 114 from which exhaust gas and reductant are received and an outlet in fluid communication with an end of the exhaust gas conduit system 106.

The decomposition chamber 114 is located upstream of the conversion catalyst 116. As a result, the reductant is injected upstream of the conversion catalyst 116 such that the conversion catalyst 116 receives a mixture of the reductant and exhaust gas. The reductant droplets undergo the processes of evaporation, thermolysis, and hydrolysis to form non-$NO_x$ emissions (e.g., gaseous ammonia, etc.) within the exhaust gas conduit system 106.

The reductant delivery system 104 includes a dosing module 118 (e.g., doser, etc.) configured to dose the reductant into the decomposition chamber 114 (e.g., via an injector, etc.). The dosing module 118 is mounted to the decomposition chamber 114 such that the dosing module 118 may dose the reductant into the exhaust gas flowing in the exhaust gas conduit system 106. The dosing module 118 may include an insulator (e.g., thermal insulator, etc.) and/or isolator (e.g., vibrational isolator, etc.) interposed between a portion of the dosing module 118 and the portion of the decomposition chamber 114 on which the dosing module 118 is mounted.

The dosing module 118 is fluidly coupled to (e.g., fluidly configured to communicate with, etc.) a reductant source 120 (e.g., reductant tank, reductant reservoir, etc.). The reductant source 120 may include multiple reductant sources 120. The reductant source 120 may be, for example, a DEF tank containing Adblue®. A reductant pump 121 (e.g., supply unit, etc.) is used to pressurize the reductant from the reductant source 120 for delivery to the dosing module 118. In some embodiments, the reductant pump 121 is pressure controlled (e.g., controlled to obtain a target pressure, etc.). The reductant pump 121 may draw the reductant through a reductant filter 122. The reductant filter 122 filters (e.g., strains, etc.) the reductant prior to the reductant being provided to internal components (e.g., pistons, vanes, etc.) of the reductant pump 121. For example, the reductant filter 122 may inhibit or prevent the transmission of solids (e.g., solidified reductant, contaminants, etc.) to the internal components of the reductant pump 121. In this way, the reductant filter 122 may facilitate prolonged desirable operation of the reductant pump 121. In some embodiments, the reductant pump 121 is coupled to a chassis of a vehicle associated with the exhaust gas aftertreatment system 102.

The dosing module 118 includes at least one injector 124 (e.g., reductant injector, etc.). Each injector 124 is configured to dose the reductant into the exhaust gas (e.g., within the decomposition chamber 114, etc.). The injector 124 may be positioned to cause the reductant to achieve a target uniformity index (UI) within the exhaust gas at a target location (e.g., at an inlet of the conversion catalyst 116, etc.).

In some embodiments, the reductant delivery system 104 also includes an air pump 126. In these embodiments, the air pump 126 draws air from an air source 128 (e.g., air intake, atmosphere, etc.) and through an air filter 130 disposed upstream of the air pump 126. The air filter 130 filters the air prior to the air being provided to internal components (e.g., pistons, vanes, etc.) of the air pump 126. For example, the air filter 130 may inhibit or prevent the transmission of solids (e.g., debris, branches, dirt, etc.) to the internal components of the air pump 126. In this way, the air filter 130 may facilitate prolonged desirable operation of the air pump 126. The air pump 126 provides the air to the dosing module 118 via a conduit. The dosing module 118 is configured to mix the air and the reductant into an air-reductant mixture and to provide the air-reductant mixture into the decomposition chamber 114. In other embodiments, the reductant delivery system 104 does not include the air pump 126 or the air source 128. In such embodiments, the dosing module 118 is not configured to mix the reductant with air.

The dosing module 118 and the reductant pump 121 are also electrically or communicatively coupled to an exhaust gas aftertreatment system controller 132. The exhaust gas aftertreatment system controller 132 is configured to control the dosing module 118 to dose the reductant into the decomposition chamber 114. The exhaust gas aftertreatment system controller 132 may also be configured to control the reductant pump 121.

The exhaust gas aftertreatment system controller 132 includes a processing circuit 134. The processing circuit 134 includes a processor 136 and a memory 138. The processor 136 may include a microprocessor, an application-specific integrated circuit (ASIC), a field-programmable gate array (FPGA), etc., or combinations thereof. The memory 138 may include, but is not limited to, electronic, optical, magnetic, or any other storage or transmission device capable of providing a processor, ASIC, FPGA, etc. with program instructions. This memory 138 may include a memory chip, Electrically Erasable Programmable Read-Only Memory (EEPROM), Erasable Programmable Read Only Memory (EPROM), flash memory, or any other suitable memory from which the exhaust gas aftertreatment system controller 132 can read instructions. The instructions may include code from any suitable programming language. The memory 138 may include various modules that include instructions which are configured to be implemented by the processor 136.

In various embodiments, the exhaust gas aftertreatment system controller 132 is electrically or communicatively coupled to a central controller 140 (e.g., engine control unit (ECU), engine control module (ECM), etc.) of an internal combustion engine having the exhaust gas aftertreatment system 102. In some embodiments, the central controller 140 and the exhaust gas aftertreatment system controller 132 are integrated into a single controller.

The central controller 140 is electrically or communicatively coupled to an indication device 142 (e.g., indicator light, display, screen, monitor, touch screen, heads up display (HUD), etc.). The indication device 142 is configured to change between a static state (e.g., displaying a green light, displaying no light, displaying a "SYSTEM OK" message, etc.), an impure fuel alarm state (e.g., displaying a blinking red light, displaying a "REPLACE FUEL" message, etc.), and an age alarm state (e.g., displaying a solid red light, displaying a "SERVICE NEEDED" message, etc.) based on a communication from the central controller 140.

By changing state, the indication device 142 may provide an indication to a user (e.g., operator, etc.) of a status (e.g., in normal operation, in need of service, in need to fuel replacement, etc.) of the reductant delivery system 104. In some embodiments, the indication device 142 may be in multiple states simultaneously (e.g., in the age alarm state and the impure fuel alarm state, etc.).

The central controller 140 is also electrically or communicatively coupled to an input device 144 (e.g., switch, selector, toggle, etc.). The input device 144 is operable between a normal operating mode and an override operating mode (e.g., emergency operating mode, etc.). As is explained in more detail herein, various components of the vehicle system 100 may not operate when the input device 144 is in the override operating mode but may operate when the input device 144 is in the normal operating mode. The input device 144 may be interacted with by a user.

The central controller 140 is also electrically or communicatively coupled to an ignition device 146 (e.g., key switch, ignition button, etc.). The ignition device 146 is operable between an on position (e.g., corresponding with a powered state of the vehicle system 100, etc.) and an off position (e.g., corresponding with an unpowered state of the vehicle system 100, etc.). As is explained in more detail herein, various components of the vehicle system 100 may not operate when the ignition device 146 is in the off position but may operate when the ignition device 146 is in the on position. The ignition device 146 may be interacted with by a user.

While not shown, it is understood that the internal combustion engine 108 includes various components, such as cylinders, pistons, fuel injectors, air intakes, and other similar components. In some applications, the internal combustion engine 108 may include a turbocharger, an exhaust gas recirculation (EGR) system, a waste heat recovery (WHR) system, and/or other similar components.

In some implementations, the particulate filter 112 may be positioned downstream of the decomposition chamber 114. For instance, the particulate filter 112 and the conversion catalyst 116 may be combined into a single unit. In some implementations, the dosing module 118 may instead be positioned downstream of a turbocharger or upstream of a turbocharger.

III. Overview of Fuel Analysis System

Figure 2:
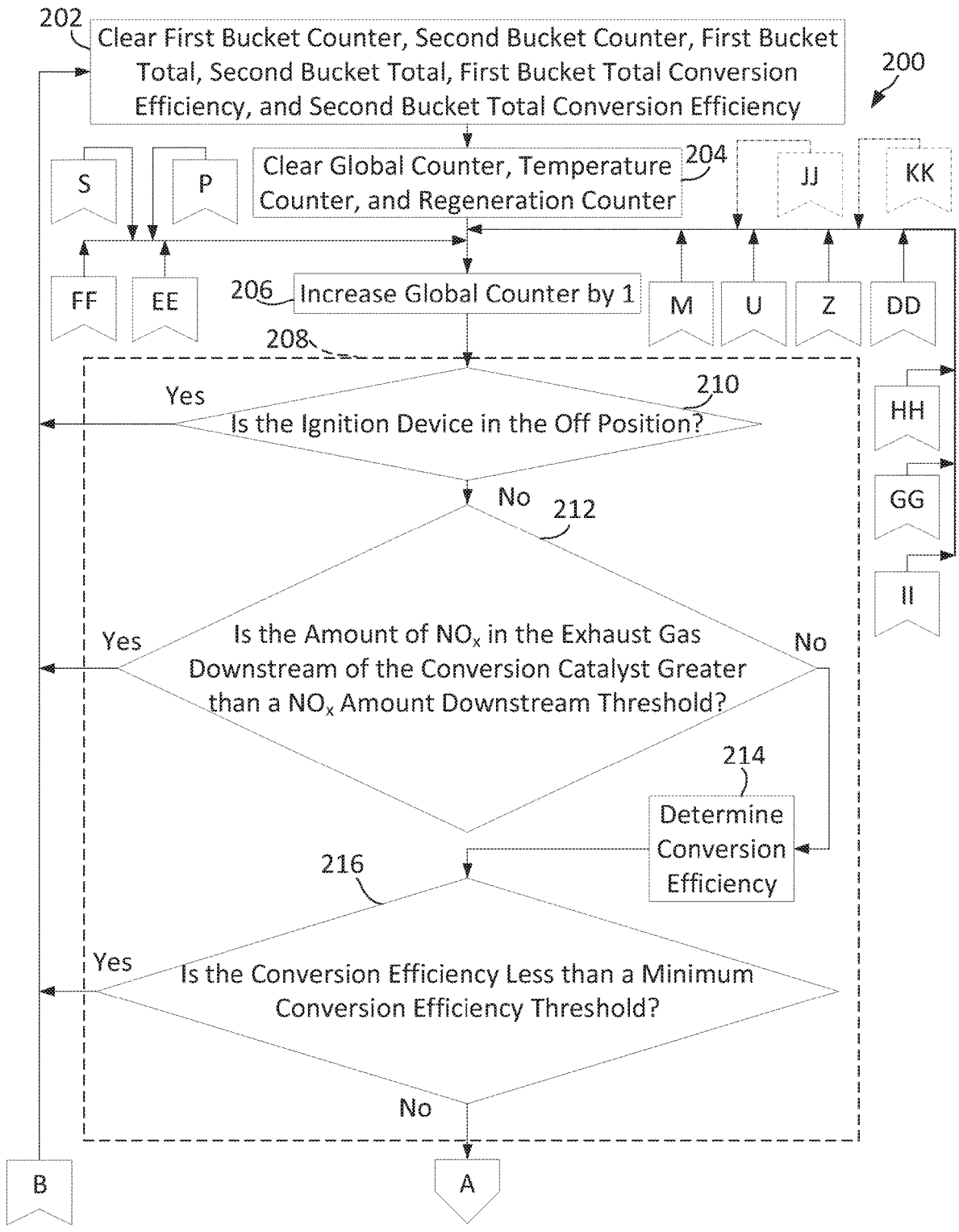
FIG. 2-17 illustrate an example fuel analysis process implemented in the vehicle system shown in FIG. 1.
Figure 3:
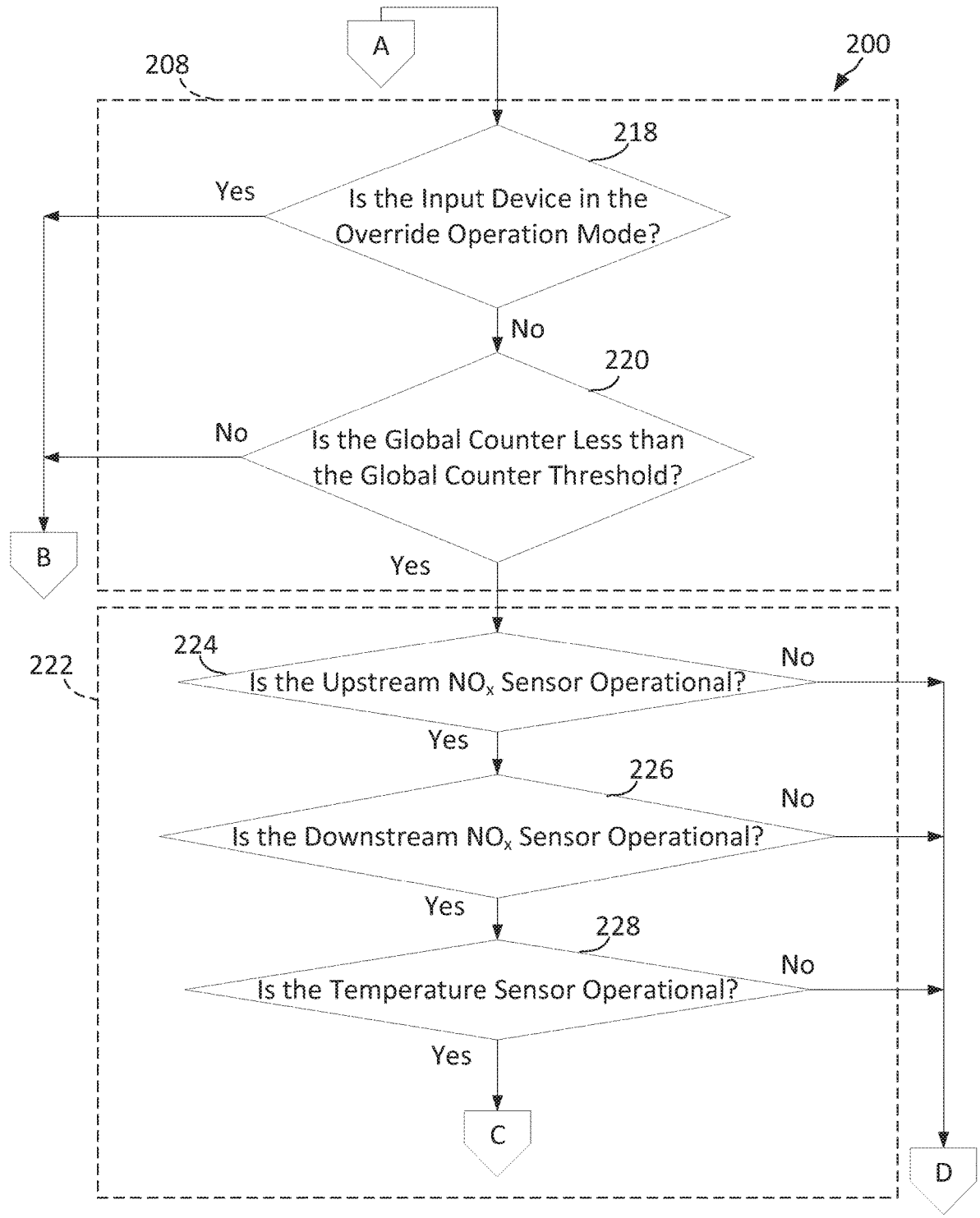
Figure 4:
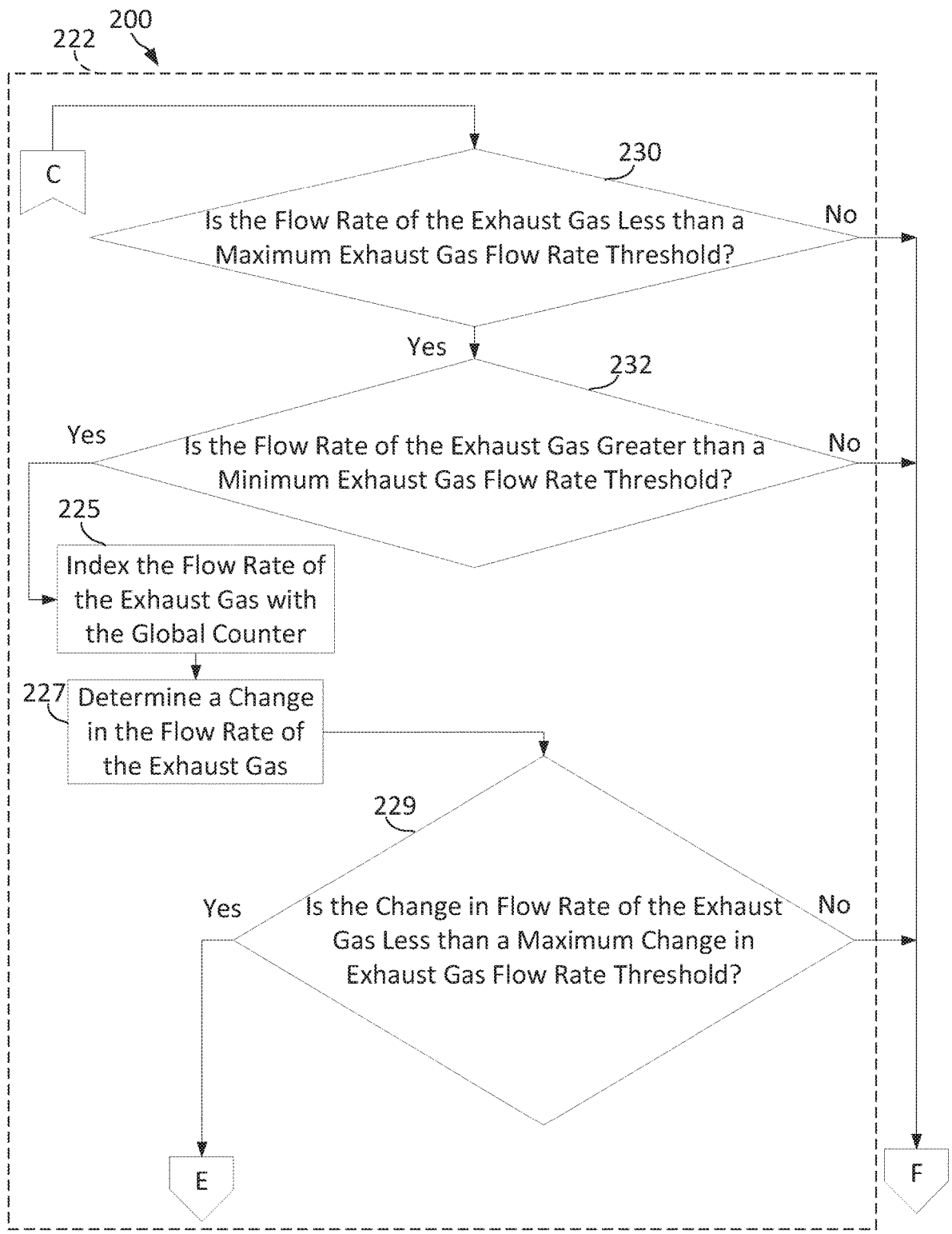
Figure 5:
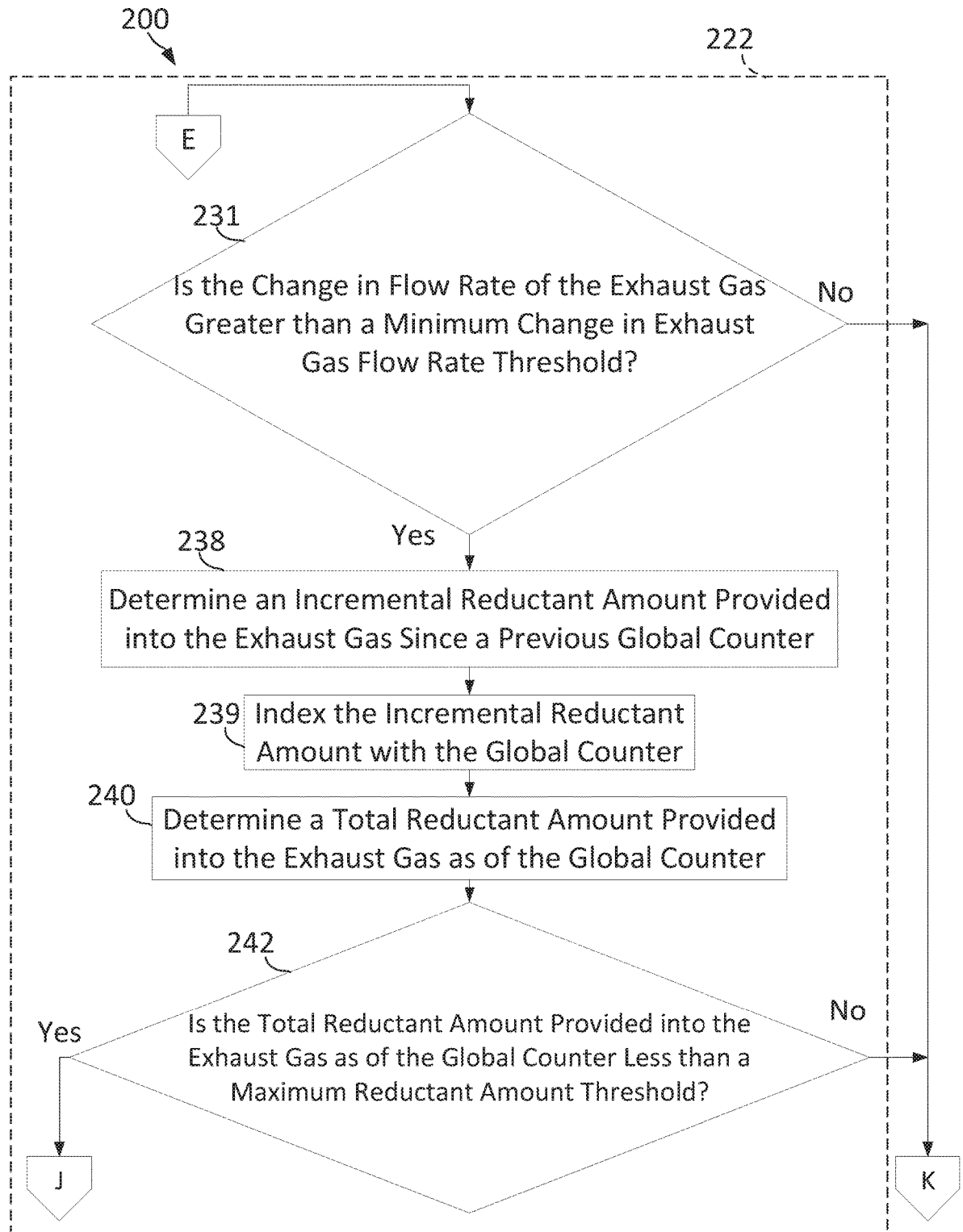
Figure 6:
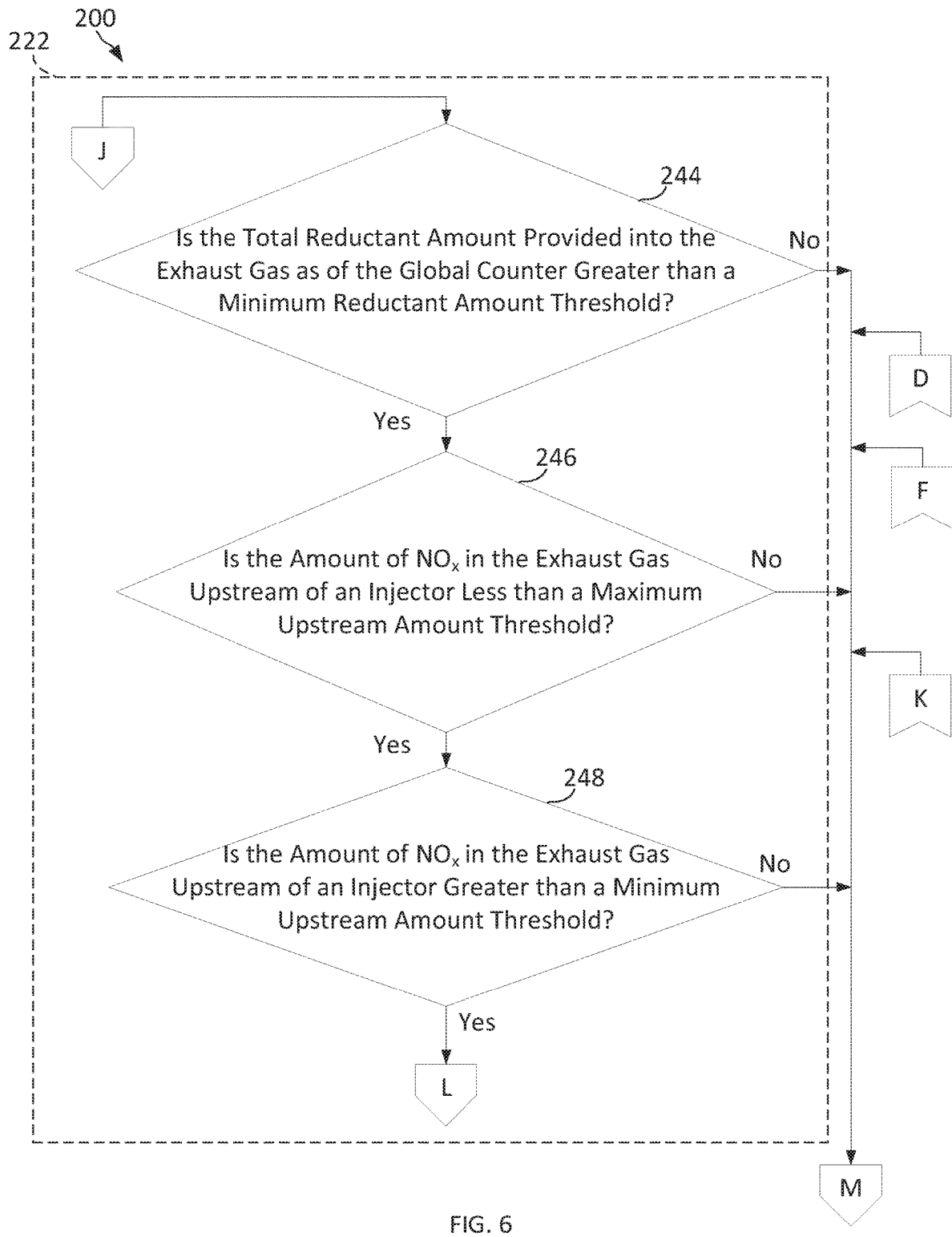
Figure 7:
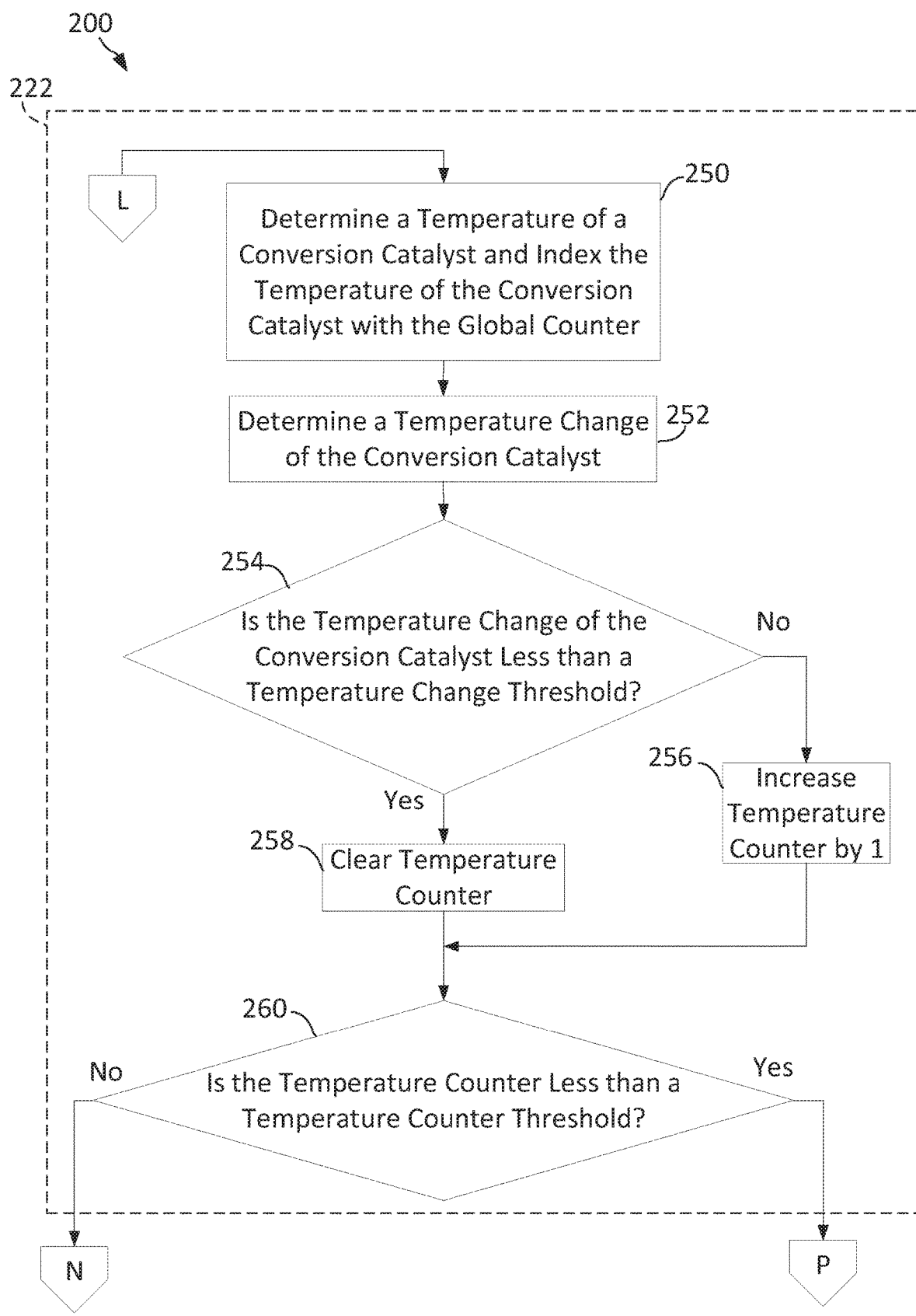
Figure 8:
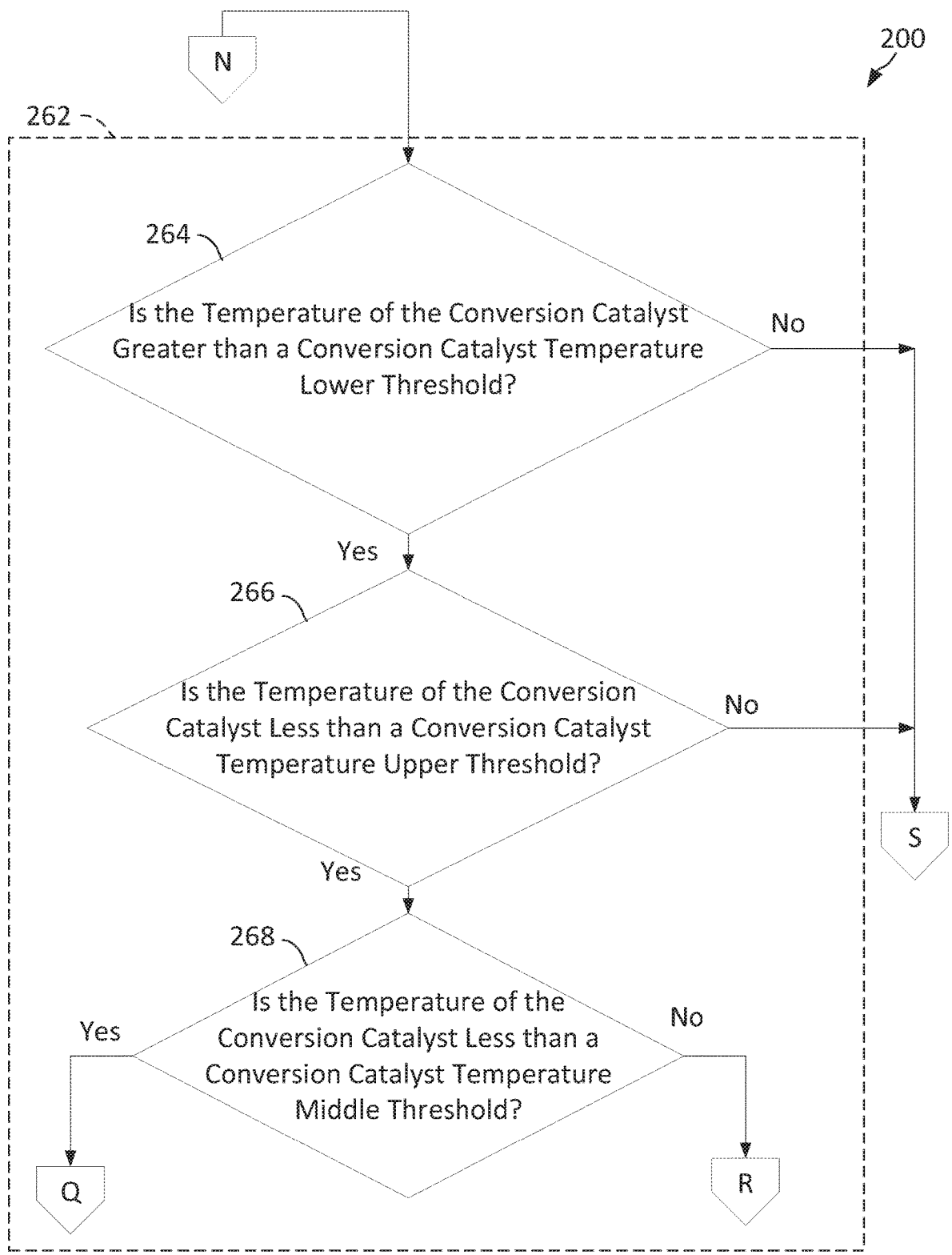
Figure 9:
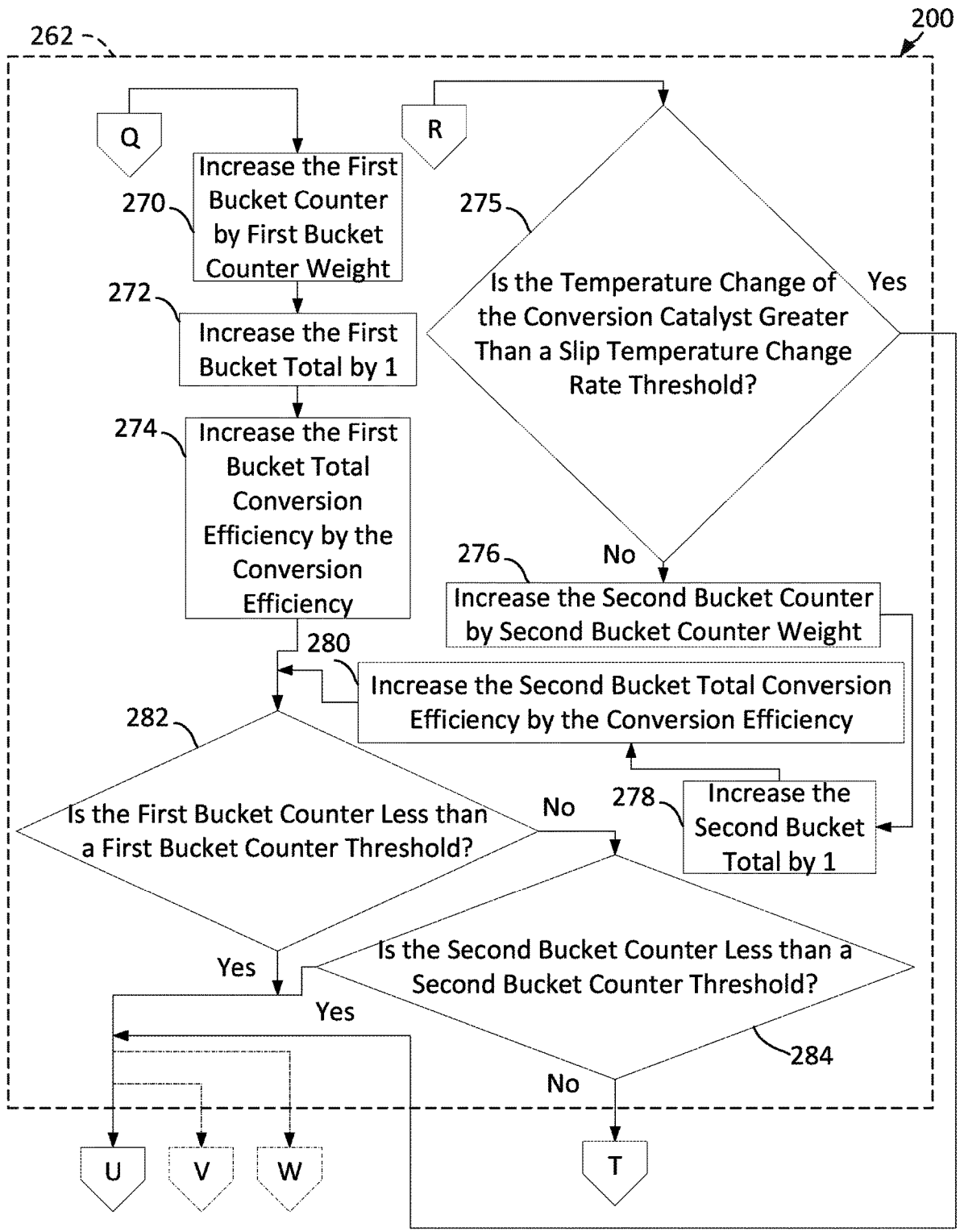
Figure 10:
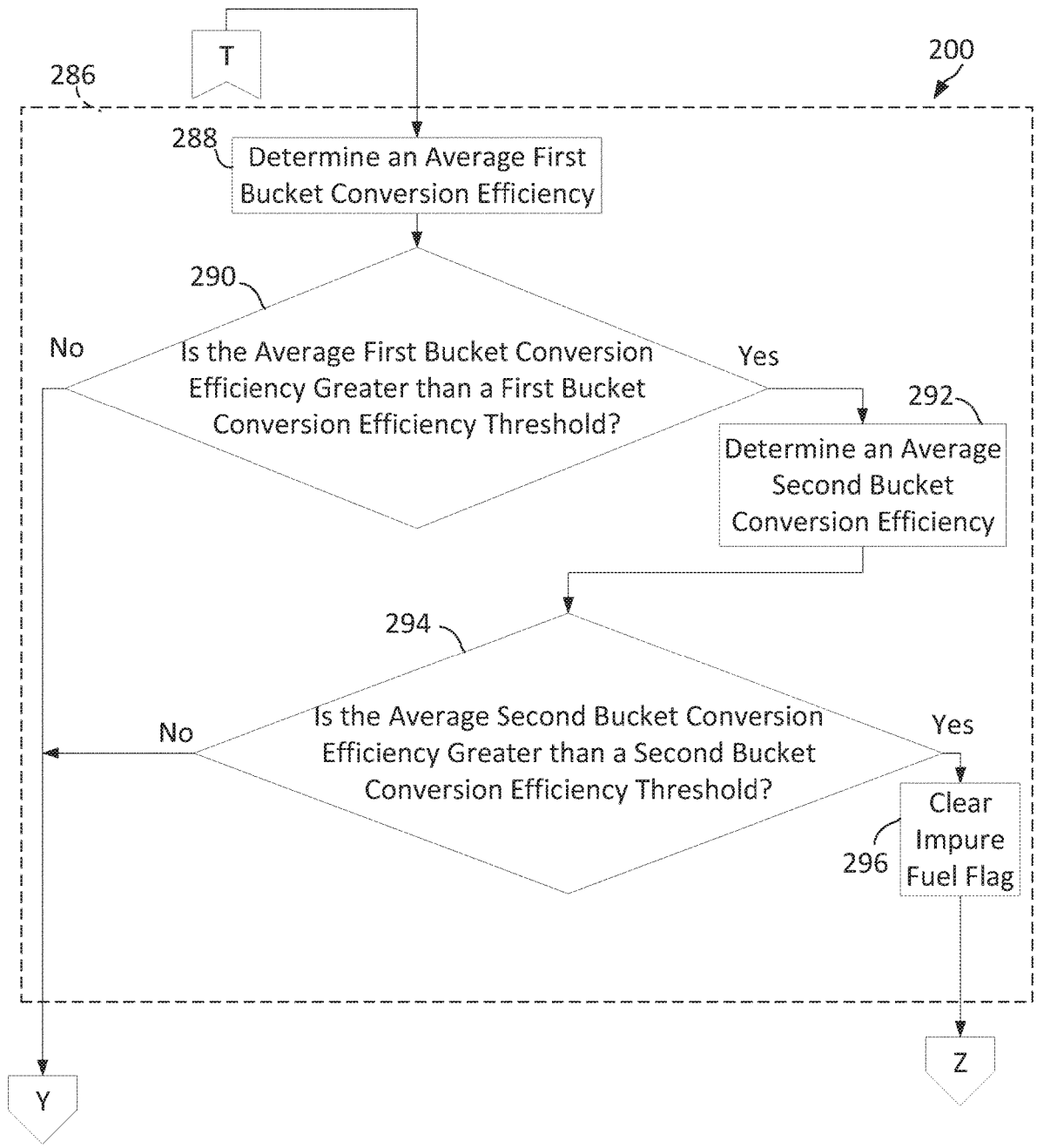
Figure 11:
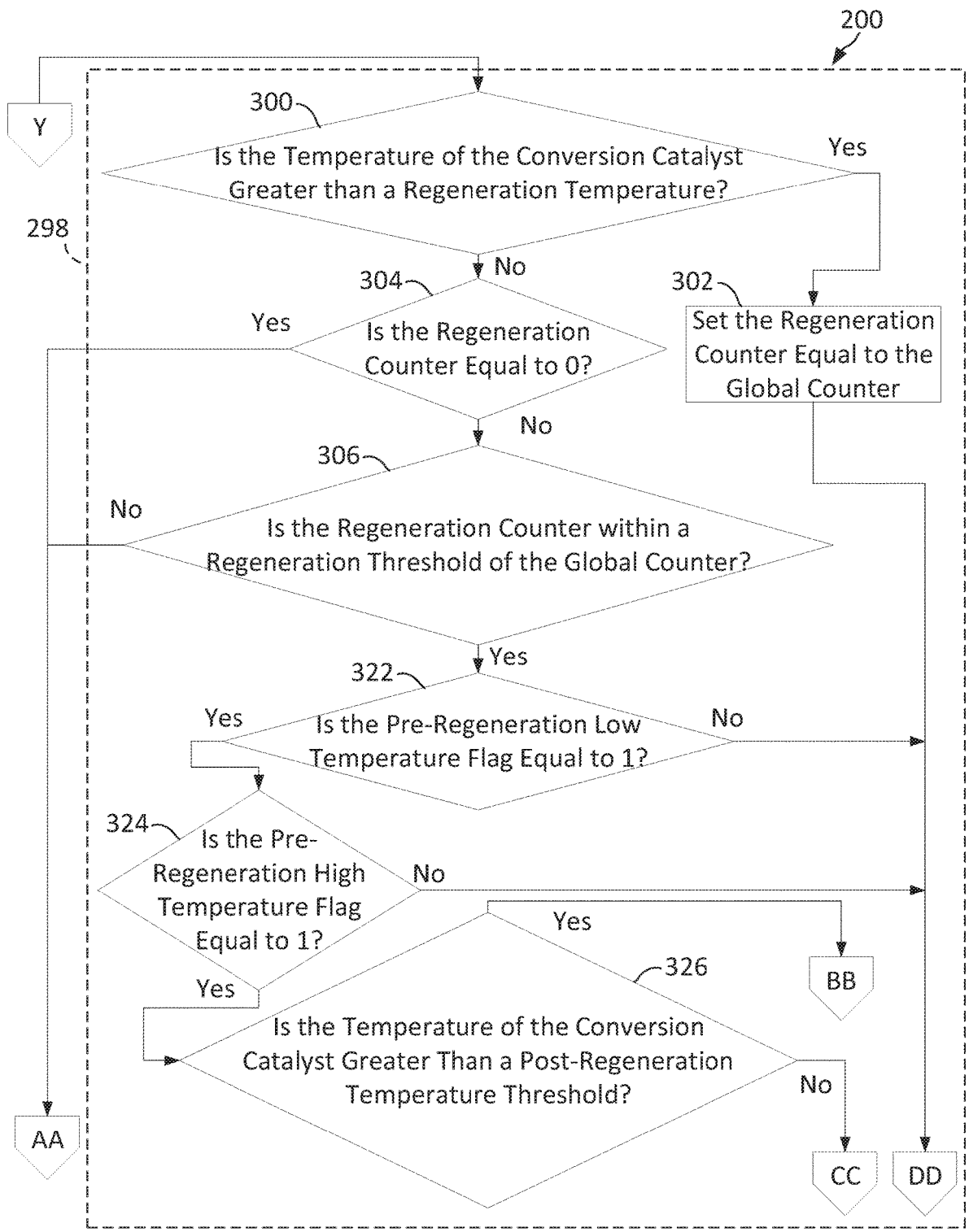
Figure 12:
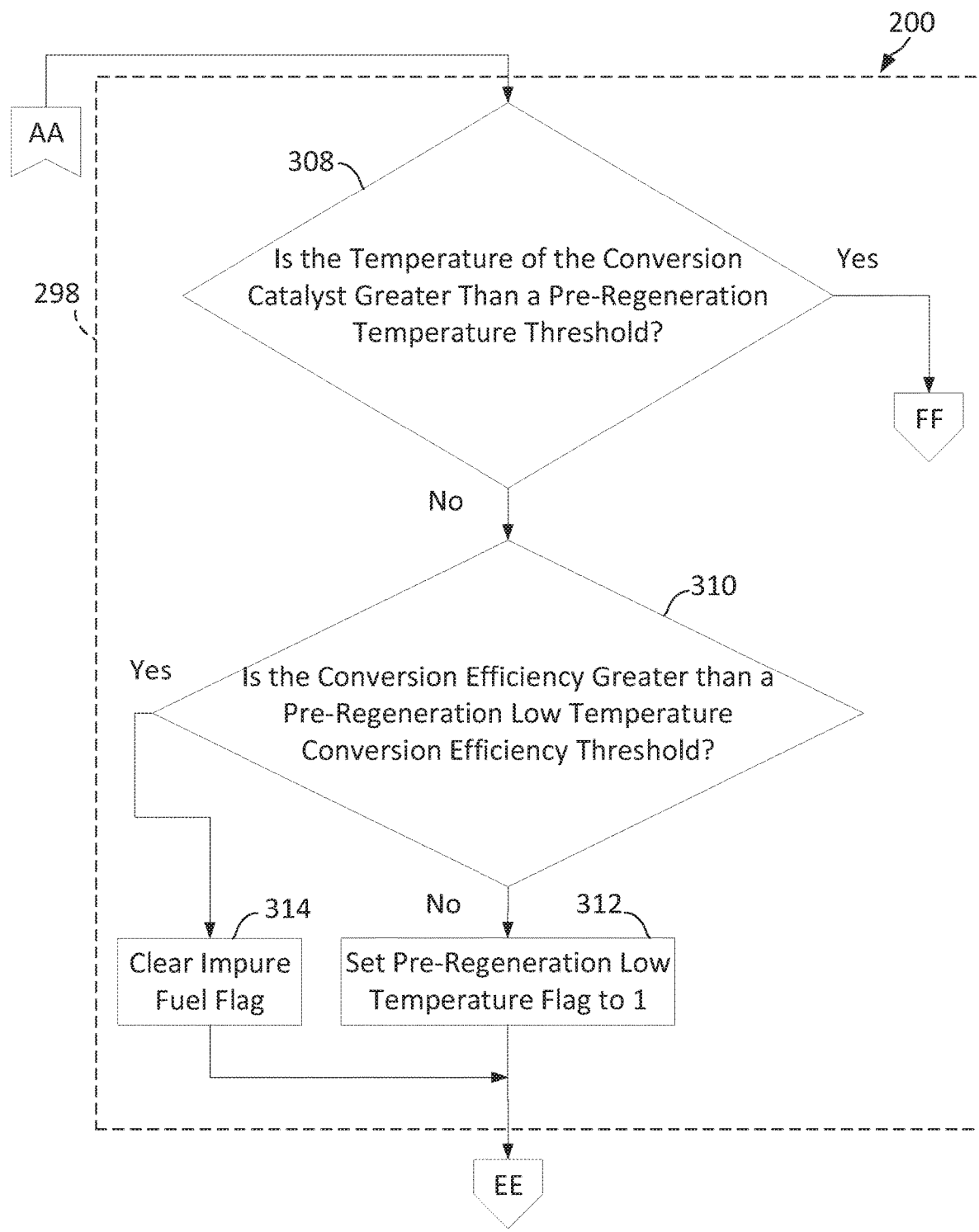
Figure 13:
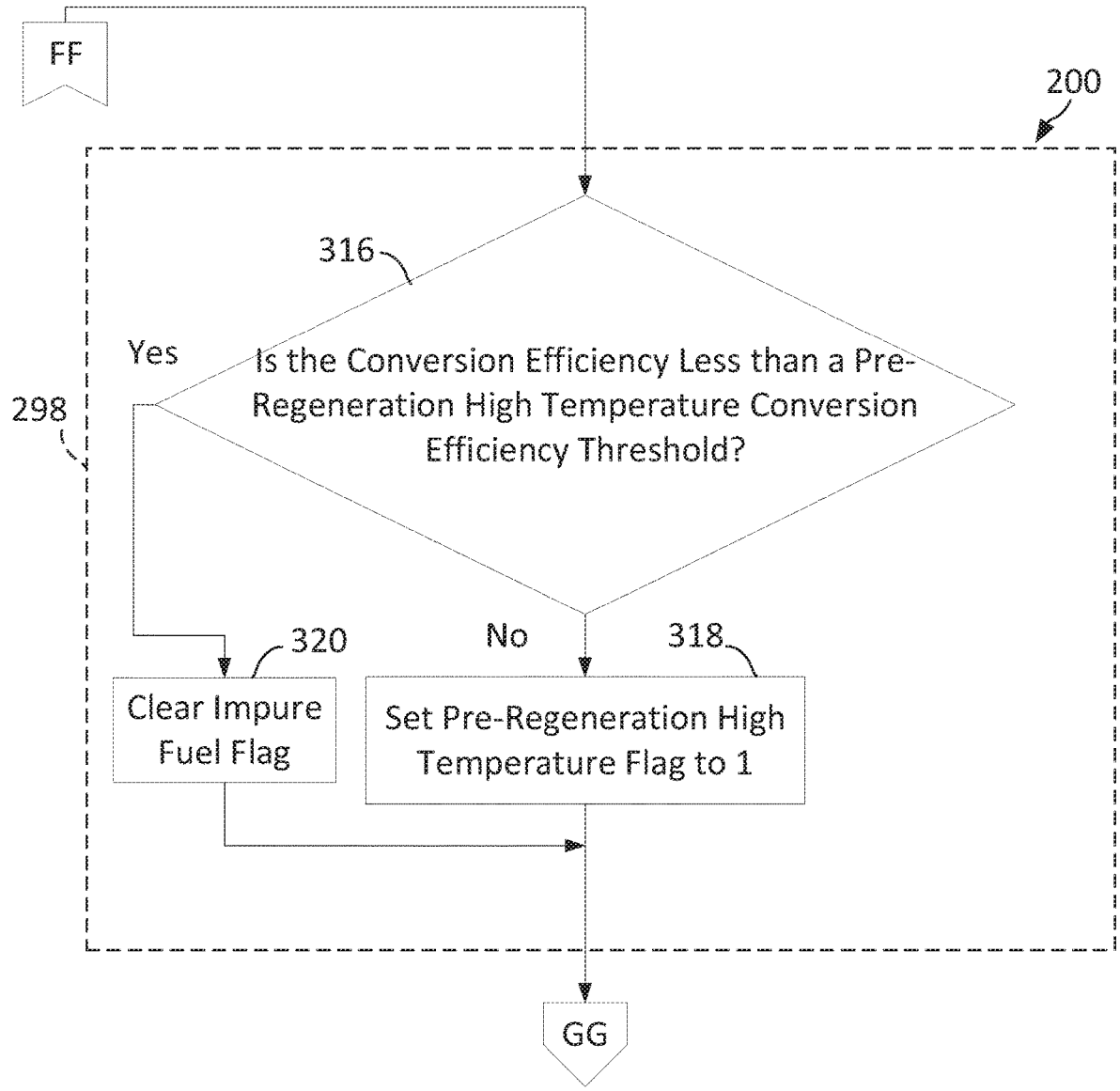
Figure 14:
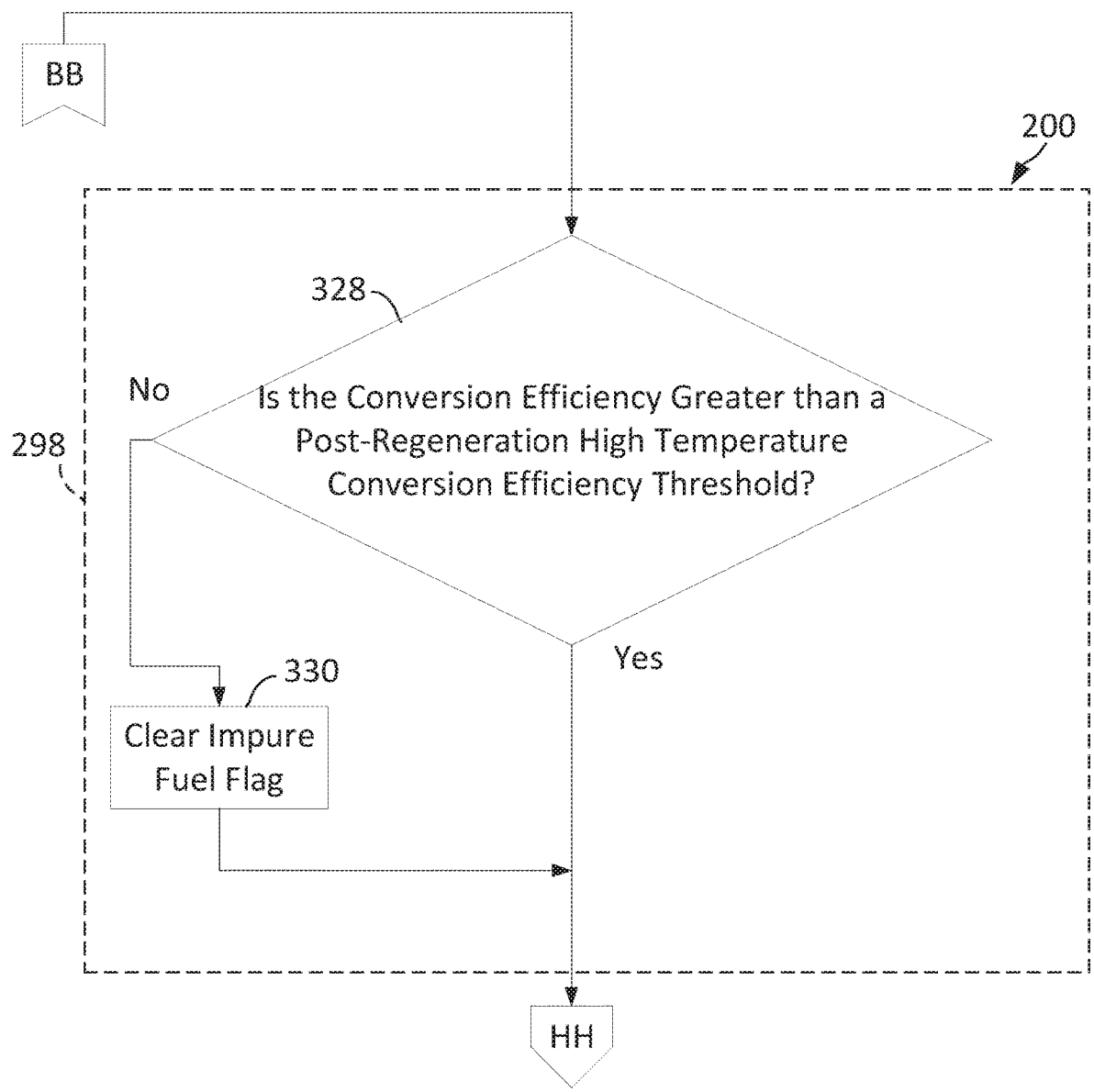
Figure 15:
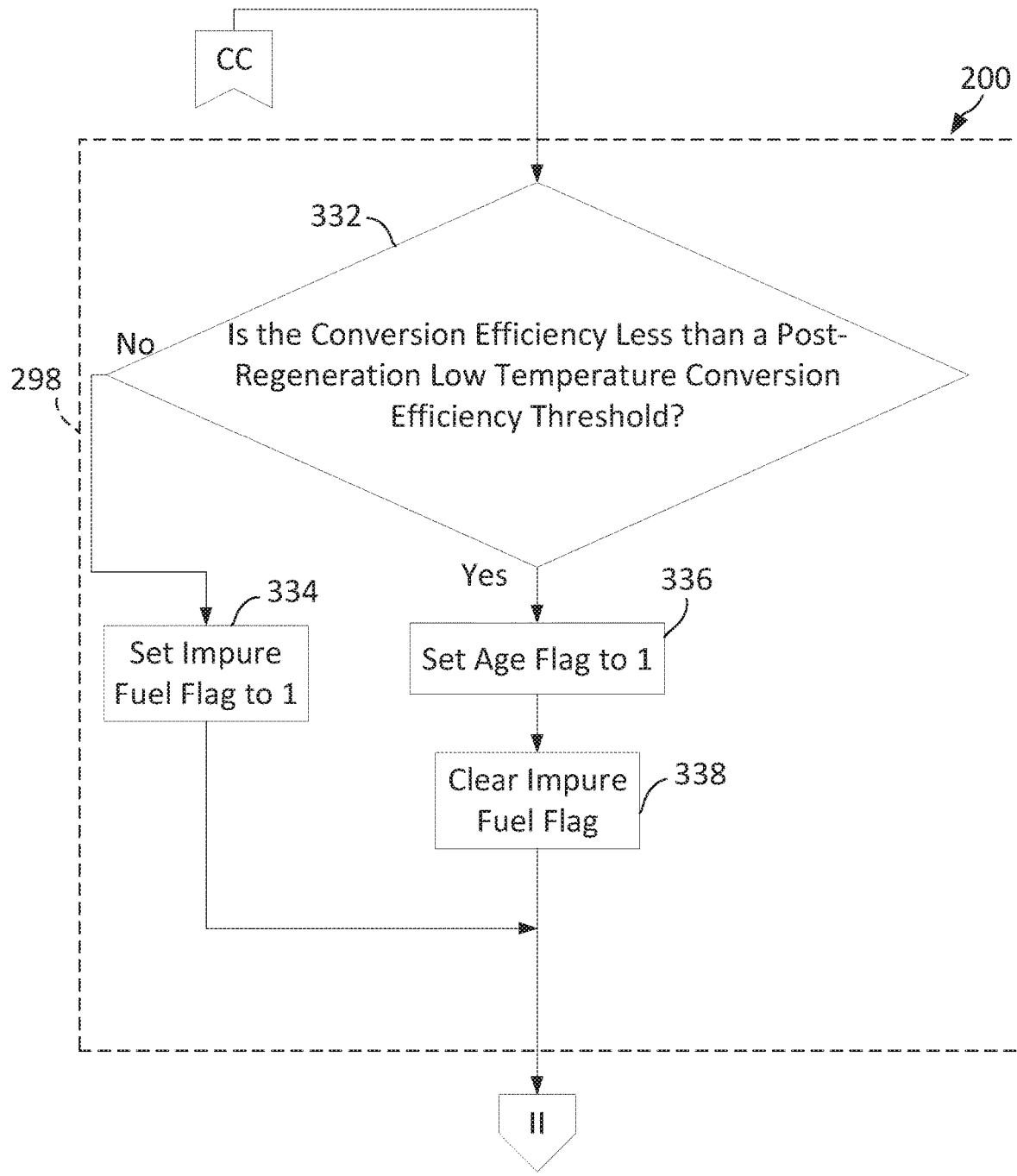
Figure 16:
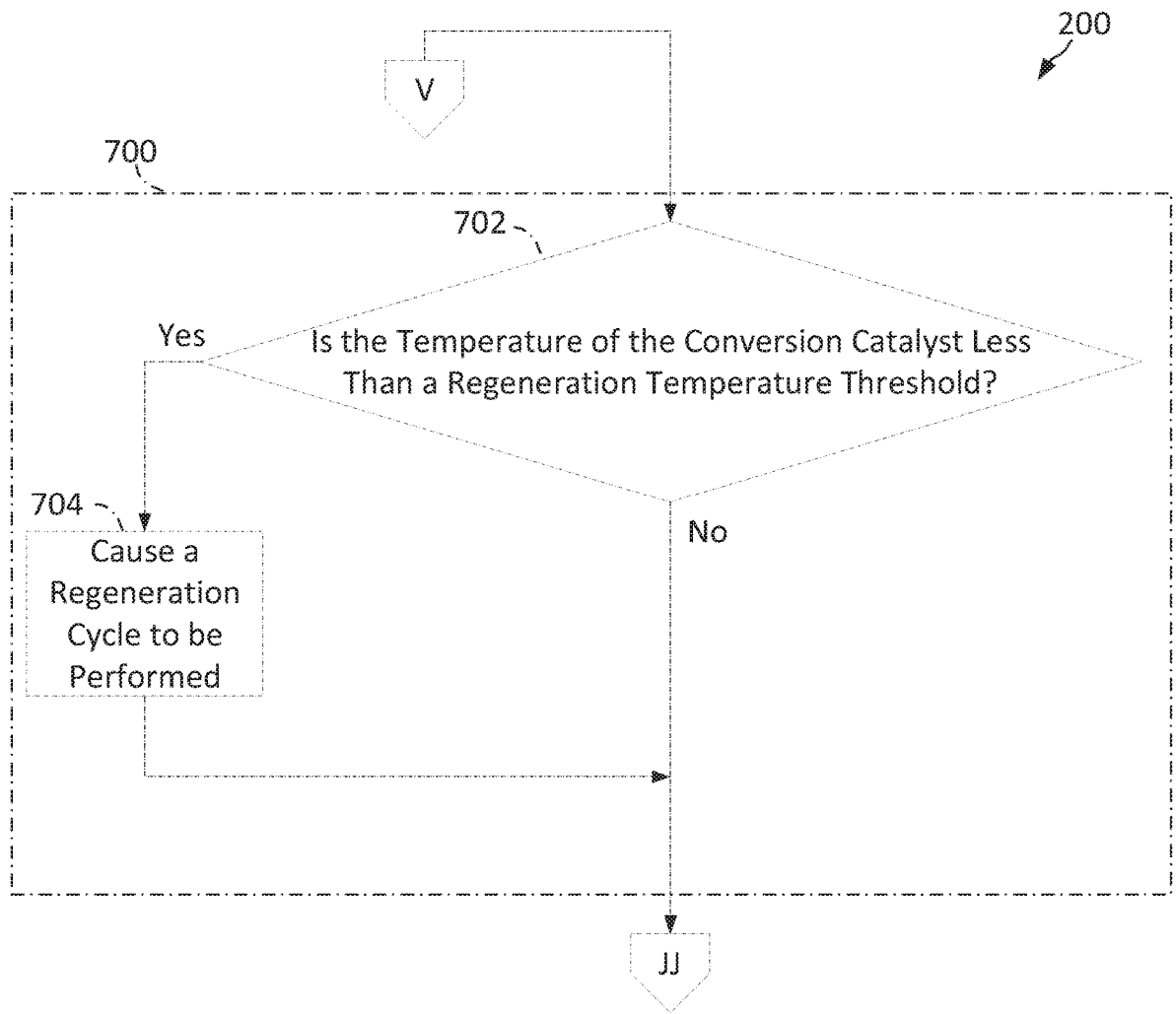
Figure 17:
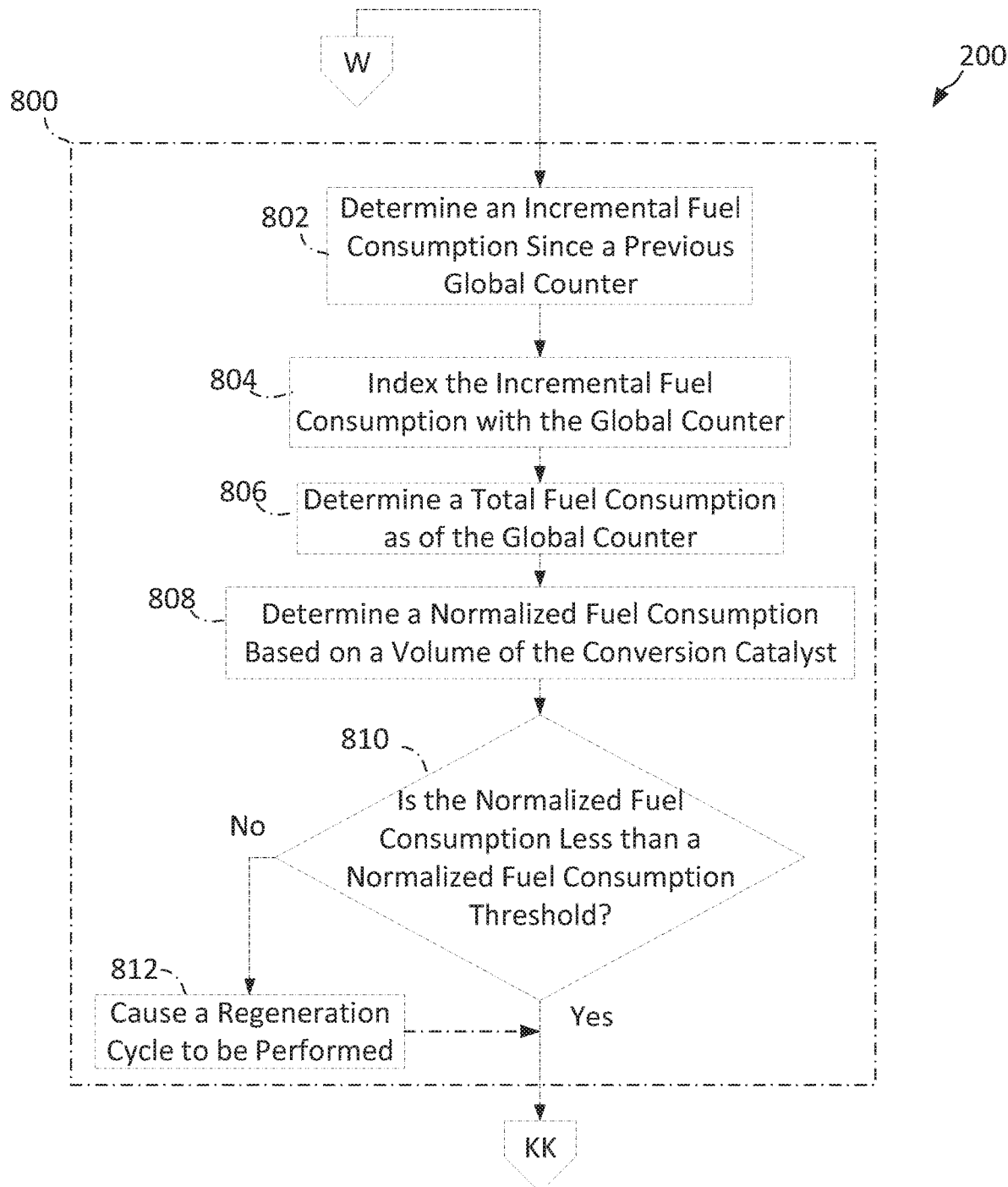

The vehicle system 100 also includes a fuel analysis system 148 (e.g., fuel impurity detection system, etc.). The fuel analysis system 148 is configured to implement a fuel analysis process, as illustrated in FIG. 2 and discussed in more detail herein, to determine when an amount (e.g., level, volume, etc.) of accumulation of atypical byproducts (e.g., sulfates, etc.) on the oxidation catalyst 111 and/or the conversion catalyst 116. As the amount of accumulation of atypical byproducts increases, a light-off temperature (e.g., a temperature at which catalytic reactions are initiated, etc.) of the oxidation catalyst 111 and/or the conversion catalyst 116 increases. The fuel analysis system 148 operates to determine when the light-off temperature of the oxidation catalyst 111 and/or the conversion catalyst 116 is too high for the vehicle system 100 to operate desirably. The fuel analysis process described herein is also capable of determining whether accumulation on the oxidation catalyst 111 and/or the conversion catalyst 116 is causing catalytic sites (e.g., locations on the oxidation catalyst 111 where a catalytic reaction can occur, locations on the conversion catalyst 116 where a catalytic reaction can occur, etc.) to become masked with accumulation, thereby reducing a storage capacity of the oxidation catalyst 111 and/or the conversion catalyst 116. As is explained in more detail herein, the fuel analysis system 148 implements the fuel analysis process by determining the amount of accumulation of atypical byproducts on the oxidation catalyst 111 and/or the conversion catalyst 116 and comparing the amount to a threshold. The fuel analysis process described herein is also capable of determining when the oxidation catalyst 111 and/or the conversion catalyst 116 are aged (e.g., in need of service, in need of replacement, etc.).

The fuel analysis system 148 may cause the exhaust gas aftertreatment system controller 132 to communicate with the central controller 140 to cause the indication device 142 to be in the impure fuel alarm state to alert a user or to halt or alter operation of the internal combustion engine 108 when it is determined that an amount of accumulation on the oxidation catalyst 111 exceeds a threshold associated with the oxidation catalyst 111 and/or an amount of accumulation on the conversion catalyst 116 exceeds a threshold associated with the conversion catalyst 116.

Additionally, the fuel analysis system 148 may cause the exhaust gas aftertreatment system controller 132 to communicate with the central controller 140 to cause the indication device 142 to be in the age alarm state to alert a user or to halt or alter operation of the internal combustion engine 108 when the fuel analysis system 148 determines that the oxidation catalyst 111 and/or the conversion catalyst 116 is aged.

In these ways and others, the fuel analysis system 148 may mitigate undesirable operation of the internal combustion engine 108 and maintain the desirability of the oxidation catalyst 111 and/or the conversion catalyst 116. As a result, the fuel analysis system 148 may reduce regeneration of the oxidation catalyst 111 and/or the conversion catalyst 116, thereby reducing fuel consumption, reduce aging of the oxidation catalyst 111 and/or the conversion catalyst 116, thereby reducing servicing, replacement, and warranty costs, reduce backpressure on the internal combustion engine 108, thereby increasing the efficiency of the internal combustion engine 108, and decrease $NO_x$ emissions and the emission of atypical byproducts from the exhaust gas aftertreatment system 102.

The fuel analysis system 148 includes an upstream $NO_x$ sensor 150 (e.g., exhaust gas analyzer, engine out $NO_x$ sensor, etc.). The upstream $NO_x$ sensor 150 is configured to determine an amount of $NO_x$ in the exhaust gas upstream of the injector 124 (e.g., upstream of the decomposition chamber 114, etc.) $A_{upstream}$. The upstream $NO_x$ sensor 150 is electrically or communicatively coupled to the exhaust gas aftertreatment system controller 132 and configured to provide the $A_{upstream}$ to the exhaust gas aftertreatment system controller 132. The upstream $NO_x$ sensor 150 may be coupled to an exhaust conduit of the exhaust gas conduit system 106 (e.g., inserted through an opening in an exhaust conduit, etc.), coupled to the oxidation catalyst 111, coupled to the particulate filter 112, coupled to the decomposition chamber 114 (e.g., upstream of the injector 124, etc.), or coupled to another component of the vehicle system 100 (e.g., downstream of the conversion catalyst 116, etc.). In various embodiments, the upstream $NO_x$ sensor 150 is located upstream of the oxidation catalyst 111.

The fuel analysis system 148 includes a downstream $NO_x$ sensor 152 (e.g., exhaust gas analyzer, system out $NO_x$ sensor, etc.). The downstream $NO_x$ sensor 152 is configured to determine a downstream amount (e.g., level, volume, etc.) of $NO_x$ in the exhaust gas downstream of the conversion catalyst 116 (e.g., in a tailpipe of the exhaust gas conduit system 106, etc.) $A_{downstream}$. The downstream $NO_x$ sensor 152 is electrically or communicatively coupled to the exhaust gas aftertreatment system controller 132 and configured to provide the $A_{downstream}$ to the exhaust gas aftertreatment system controller 132. The downstream $NO_x$ sensor 152 may be coupled to an exhaust conduit of the exhaust gas conduit system 106 (e.g., inserted through an opening in an exhaust conduit, etc.) or coupled to another component of the vehicle system 100 (e.g., downstream of the conversion catalyst 116, etc.). In various embodiments, the downstream $NO_x$ sensor 152 is located downstream of the conversion catalyst 116.

The memory 138 includes a counter module 153 (e.g., circuit, etc.). The counter module 153 stores a first bucket counter $B_1$, a second bucket counter $B_2$, a first bucket total $Y_1$, a second bucket total $Y_2$, a first bucket total conversion efficiency $C_{B1}$, a second bucket total conversion efficiency $C_{B2}$, a global counter $\alpha$, a temperature counter $\Omega$, a regeneration counter $\varphi$, a global counter threshold $R_\alpha$, a temperature counter threshold $R_\Omega$, a first bucket counter threshold $R_{B1}$, and a second bucket counter threshold $R_{B2}$. The $B_1$, the $B_2$, the $Y_1$, the $Y_2$, the $C_{B1}$, the $C_{B2}$, the $\alpha$, the $\Omega$, the $\varphi$, the $R_\alpha$, the $R_{B1}$, and the $R_{B2}$ may be provided to the memory 138 (e.g., via an external device, via a manufacturer, etc.) or may be determined by the processing circuit 134 via machine learning (e.g., observing the behavior of the exhaust gas aftertreatment system 102 over time, etc.).

As is explained in more detail herein, the $B_1$, the $B_2$, the $Y_1$, the $Y_2$, the $C_{B1}$, and the $C_{B2}$ are utilized to determine when the light-off temperature of the oxidation catalyst 111 and/or the conversion catalyst 116 is too high for the vehicle system 100 to operate desirably and when the oxidation catalyst 111 and/or the conversion catalyst 116 are aged (e.g., in need of service, in need of replacement, etc.) and then, in response to such a determination, communicate with the central controller 140 to either cause the indication device 142 to change state (e.g., from the static state to the impure fuel alarm state, from the static state to the aged alarm state, etc.) or to halt or alter operation of the internal combustion engine 108.

As is explained in more detail herein, the $\alpha$ is used by the fuel analysis system 148 to determine how many iterations that fuel analysis process 200 has gone through since the $B_1$ and the $B_2$ were last cleared, the $\Omega$ is used to track changes in the temperature of the conversion catalyst 116, and the $\varphi$ is used to determine the amount of time that has elapsed since the most recent regeneration cycle was performed. The $R_\alpha$ may be approximately equal to 250, 500, 2000, 4000, 6000, 8000, 10,000, 12,000, 14,000, or other similar values. The $R_\Omega$ may be approximately equal to 2, 3, 5, 8, 10, or other similar values. The $R_{B1}$ may be approximately equal to 1, 2, 3, 5, 8, 10, or other similar values. The $R_{B2}$ may be approximately equal to 1, 2, 3, 5, 8, 10, or other similar values. The $R_{B2}$ may be the same as, or different from, the $R_{B1}$.

The memory 138 includes a conversion efficiency module 154 (e.g., circuit, etc.). The conversion efficiency module 154 is configured to determine a conversion efficiency C based on the Aupstream and the Adownstream. The conversion efficiency C is calculated using $$C = \frac{A_{upstream} - A_{downstream}}{A_{upstream}} \quad (1)$$

and is a measure of the ability of the exhaust gas aftertreatment system 102 to reduce the $NO_x$ produced by the internal combustion engine 108.

The conversion efficiency module 154 also stores a first bucket conversion efficiency threshold $R_{CB1}$, a second bucket conversion efficiency threshold $R_{CB2}$, a pre-regeneration low temperature conversion efficiency threshold $R_{Cprelow}$, a pre-regeneration high temperature conversion efficiency threshold $R_{Cprehigh}$, a post-regeneration low temperature conversion efficiency threshold $R_{Cpostlow}$, and a post-regeneration high temperature conversion efficiency threshold $R_{Cposthigh}$. As is explained in more detail herein, the fuel analysis system 148 utilizes the $R_{CB1}$ and the $R_{CB2}$ in conjunction with the $B_1$ and the $B_2$ to ultimately determine if the amount of accumulation of atypical byproducts on the oxidation catalyst 111 and/or the conversion catalyst 116 is above a threshold. The $R_{CB1}$ and the $R_{CB2}$ may be provided to the memory 138 or may be determined by the processing circuit 134 via machine learning. In various embodiments, the $R_{CB1}$ and the $R_{CB2}$ are each 0.8. In some embodiments, the $R_{CB1}$ and/or the $R_{CB2}$ may be approximately equal to (e.g., within 5% of, etc.) 0.6, 0.65, 0.7, 0.75, 0.8, 0.85, 0.9, 0.95, or other similar values. As is explained in more detail herein, the $R_{Cprelow}$, the $R_{Cprehigh}$, the $R_{Cpostlow}$, and the $R_{Cposthigh}$ are utilized to determine if the fuel being consumed is impure or if the conversion catalyst 116 is aged. The $R_{Cprelow}$ may be approximately equal to 0.6, 0.65, 0.7, 0.75, 0.8, 0.85, 0.9, 0.95, or other similar values. The $R_{Cprehigh}$ may be approximately equal to 0.6, 0.65, 0.7, 0.75, 0.8, 0.85, 0.9, 0.95, or other similar values. In some embodiments, the $R_{Cprelow}$ is equal to the $R_{Cprehigh}$. The $R_{Cpostlow}$ may be approximately equal to 0.6, 0.65, 0.7, 0.75, 0.8, 0.85, 0.9, 0.95, or other similar values. The $R_{Cposthigh}$ may be approximately equal to 0.6, 0.65, 0.7, 0.75, 0.8, 0.85, 0.9, 0.95, or other similar values. In some embodiments, the $R_{Cpostlow}$ is equal to the $R_{Cposthigh}$. In some embodiments, the $R_{Cprelow}$, the $R_{Cprehigh}$, the $R_{Cpostlow}$, and the $R_{Cposthigh}$ are all equal to each other (e.g., have the same value, etc.).

The conversion efficiency module 154 also stores a downstream $NO_x$ amount threshold $R_{downstream}$ and a minimum conversion efficiency threshold $R_{cmin}$. The $R_{cmin}$ is less than the $R_{CB1}$ and less than the $R_{CB2}$. In some embodiments, the $R_{cmin}$ is 0.2. In some applications, the $R_{cmin}$ may be approximately equal to 0.05, 0.1, 0.15, 0.2, 0.25, 0.3, or other similar values. In some embodiments, the $R_{downstream}$ may be approximately equal to 3,000 parts per million (ppm) or other similar values.

The fuel analysis system 148 includes a temperature sensor 156 (e.g., thermocouple, etc.). The temperature sensor 156 is configured to determine a temperature (e.g., bed temperature, etc.) of the conversion catalyst 116 $T_{conversion}$. The temperature sensor 156 is electrically or communicatively coupled to the exhaust gas aftertreatment system controller 132 and configured to provide the $T_{conversion}$ to the exhaust gas aftertreatment system controller 132. The temperature sensor 156 may be coupled to an exhaust conduit of the exhaust gas conduit system 106 (e.g., inserted through an opening in an exhaust conduit, etc.) or coupled to the conversion catalyst 116 (e.g., inserted through an opening in the conversion catalyst 116, etc.).

The memory 138 also includes a temperature module 158 (e.g., circuit, etc.). The temperature module 158 stores a conversion catalyst temperature lower threshold $R_{LT}$, a conversion catalyst temperature middle threshold $R_{MT}$, a conversion catalyst temperature upper threshold $R_{UT}$, a regeneration temperature $T_{regeneration}$, a regeneration threshold $R_\varphi$, a pre-regeneration temperature threshold $R_{Tpre}$, a post-regeneration temperature threshold $R_{Tpost}$, and a regeneration temperature threshold $R_{regeneration}$. The $R_{LT}$, $R_{MT}$, $R_{UT}$, $T_{regeneration}$, the $R_\varphi$, the $R_{Tpre}$, the $R_{Tpost}$, and the $R_{regeneration}$ may be provided to the memory 138 or may be determined by the processing circuit 134 via machine learning.

As is described in more detail herein, the temperature module 158 is configured to compare the $T_{conversion}$ to the $R_{LT}$, the $R_{MT}$, and the $R_{UT}$. As is explained in more detail herein, the fuel analysis system 148 utilizes the $R_{LT}$, the $R_{MT}$, and the $R_{UT}$ to ultimately determine if the amount of accumulation of atypical byproducts on the oxidation catalyst 111 and/or the conversion catalyst 116 is above a threshold. The $R_{LT}$, the $R_{MT}$, and the $R_{UT}$ may be provided to the memory 138 or may be determined by the processing circuit 134 via machine learning. In various embodiments, the $R_{LT}$ is 190 degrees Celsius (° C.). In some applications, the $R_{LT}$ may be approximately 170° C., 180° C., 190° C., 200° C., 210° C., 220° C., 230° C., 240° C., 250° C., or other similar values. In various embodiments, the $R_{MT}$ is 260° C. In some applications, the $R_{MT}$ may be approximately 240° C., 250° C., 260° C., 270° C., 280° C., 290° C., 300° C., or other similar values. In various embodiments, the $R_{UT}$ is 360° C. In some applications, the $R_{UT}$ may be approximately 330° C., 340° C., 350° C., 360° C., 370° C., 380° C., 390° C., or other similar values. The $T_{regeneration}$ is associated with a regeneration cycle being performed by the exhaust gas aftertreatment system 102. The $T_{regeneration}$ may be approximately equal to 430° C., 440° C., 450° C., 460° C., or other similar values. The $R_\varphi$ may be approximately equal to 10, 20, 30, 100, 500, 1000, 5000, 20,000, 100,000, or other similar values. The $R_{Tpre}$ may be approximately equal to 260° C., 270° C., 280° C., 290° C., 300° C., 310° C., 320° C., 330° C., 340° C., 350° C., 360° C., or other similar values. The $R_{Tpost}$ may be approximately equal to 260° C., 270° C., 280° C., 290° C., 300° C., 310° C., 320° C., 330° C., 340° C., 350° C., 360° C., or other similar values. In some embodiments, the $R_{Tpre}$ is equal to the $R_{Tpost}$. The $R_{regeneration}$ may be approximately equal to 310° C., 315° C., 320° C., 325° C., 330° C., 335° C., 340° C., 350° C., 360° C., 370° C., or other similar values.

The memory 138 also includes an abort module 160 (e.g., circuit, etc.). The abort module 160 stores at least one abort condition and is configured to determine when each of the at least one abort condition is present. The at least one abort condition may include receiving an error from the upstream $NO_x$ sensor 150 (e.g., indicating that the upstream $NO_x$ sensor 150 is not operational, etc.), receiving an error from the downstream $NO_x$ sensor 152 (e.g., indicating that the downstream $NO_x$ sensor 152 is not operational, etc.), receiving an error from the temperature sensor 156 (e.g., indicating that the temperature sensor 156 is not operational, etc.), determining that the input device 144 is in the override operating mode, determining that the ignition device 146 is in the off position, and determining that the fuel analysis process implemented by the fuel analysis system 148 has been going on for too long of a period of time.

The fuel analysis system 148 also includes an exhaust gas flow rate sensor 162 (e.g., mass flow sensor, volumetric flow sensor, etc.). The exhaust gas flow rate sensor 162 is configured to determine a flow rate (e.g., mass flow rate, volumetric flow rate, etc.) Fe of the exhaust gas within the exhaust gas aftertreatment system 102 (e.g., of the exhaust gas flowing through an exhaust conduit of the exhaust gas conduit system 106, etc.). The exhaust gas flow rate sensor 162 is electrically or communicatively coupled to the exhaust gas aftertreatment system controller 132 and configured to provide the Fe to the exhaust gas aftertreatment system controller 132. The exhaust gas flow rate sensor 162 may be coupled to an exhaust conduit of the exhaust gas conduit system 106 (e.g., inserted through an opening in an exhaust conduit, etc.), coupled to the oxidation catalyst 111 (e.g., inserted through an opening in the oxidation catalyst 111, etc.), coupled to the particulate filter 112 (e.g., inserted through an opening in the particulate filter 112, etc.), coupled to the decomposition chamber 114 (e.g., inserted through an opening in the decomposition chamber 114, etc.), or coupled to the conversion catalyst 116 (e.g., inserted through an opening in the conversion catalyst, etc.).

The fuel analysis system 148 also includes a reductant flow rate sensor 164 (e.g., mass flow sensor, volumetric flow sensor, etc.). The reductant flow rate sensor 164 is configured to determine a flow rate Fr of the reductant being provided from the injector 124 into the decomposition chamber 114. The reductant flow rate sensor 164 is electrically or communicatively coupled to the exhaust gas aftertreatment system controller 132 and configured to provide the Fr to the exhaust gas aftertreatment system controller 132. The reductant flow rate sensor 164 may be coupled to the injector 124, the dosing module 118, a reductant conduit (e.g., a reductant conduit between the reductant pump 121 and the dosing module 118, etc.), the reductant pump 121, the reductant filter 122, the reductant source 120, an air conduit (e.g., an air conduit between the air pump 126 and the dosing module 118), the air pump 126, the air filter 130, or the air source 128.

The memory 138 also includes an enable module 166 (e.g., circuit, etc.). The enable module 166 stores at least one enable condition and is configured to determine when each of the at least one enable condition is present. The at least one enable condition may include receiving a signal from the upstream $NO_x$ sensor 150 indicating that the upstream $NO_x$ sensor 150 is operational, receiving a signal from the downstream $NO_x$ sensor 152 indicating that the downstream $NO_x$ sensor 152 is operational, the Fe being within a target exhaust gas flow rate range, the Fr being within a target reductant flow rate range, receiving a signal from the upstream $NO_x$ sensor 150 indicating that the $A_{upstream}$ is within an upstream range, and determining that a change in the $T_{conversion}$ over time is less than a temperature change threshold $R_{\Delta T}$ for a temperature change threshold time $R_{\Delta Tt}$. In some embodiments, the $R_{\Delta T}$ is equal to 0.1° C./sec, 0.05° C./sec, 0.01° C./sec, or other similar values. In some embodiments, the $R_{\Delta Tt}$ is equal to 5 seconds, 10 seconds, 15 seconds, or other similar values.

The memory 138 also includes a regeneration module 168 (e.g., circuit, etc.). The regeneration module 168 is configured to cause the internal combustion engine 108 to perform a regeneration (e.g., active regeneration, etc.) cycle. During a regeneration cycle, fuel may be entrained in the exhaust gas provided to the oxidation catalyst (e.g., due to the internal combustion engine 108 consuming additional fuel, due to the injection of fuel into the exhaust conduit, etc.). Once in the oxidation catalyst, the fuel oxidizes which creates heat that may cause particulate matter collected in the oxidation catalyst 111 to be combusted (e.g., burned-off, etc.). By burning off the particulate matter, backpressure experienced by the internal combustion engine 108 may decrease, thereby making operation of the internal combustion engine 108 more desirable.

The memory 138 also includes a flag module 170 (e.g., circuit, etc.). The flag module 170 is configured to be set in a normal state, an impure fuel state, and an aged state. The flag module 170 is configured to communicate with the central controller 140 to cause the indication device 142 to be in the static state in response to being in the normal state, in the impure fuel alarm state in response to being in the impure fuel state, and in the age alarm state in response to being in the aged state.

The memory 138 also includes an exhaust gas module 172 (e.g., circuit, etc.). The exhaust gas module 172 stores a maximum exhaust gas flow rate threshold $R_{emax}$, a minimum exhaust gas flow rate threshold $R_{emin}$, a maximum change in exhaust gas flow rate threshold $R_{\Delta emax}$, a minimum change in exhaust gas flow rate threshold $R_{\Delta emin}$, and a slip temperature change rate threshold $R_{\Delta Tslip}$. As is explained in more detail herein, the $R_{\Delta Tslip}$ is utilized to determine if slip of ammonia from the conversion catalyst 116 is occurring. The $R_{emax}$, the $R_{emin}$, the $R_{\Delta emax}$, and the $R_{\Delta emin}$ may be provided to the memory 138 or may be determined by the processing circuit 134 via machine learning. The $R_{emax}$ may be approximately equal to 270 grams per second (g/sec), 280 g/sec, 290 g/sec, 300 g/sec, 310 g/sec, or other similar values. The $R_{emin}$ may be approximately equal to 80 g/sec, 90 g/sec, 100 g/sec, 110 g/sec, 120 g/sec, or other similar values. The $R_{\Delta emax}$ may be approximately equal to 4 grams per second squared (g/sec$^2$), 5 g/sec$^2$, 6 g/sec$^2$, 7 g/sec$^2$, 8 g/sec$^2$, or other similar values. The $R_{\Delta emin}$ may be approximately equal to –4 g/sec$^2$, –5 g/sec$^2$, –6 g/sec$^2$, –7 g/sec$^2$, –8 g/sec$^2$, or other similar values. In some embodiments, the $R_{\Delta Tslip}$ is equal to 0.1° C./sec, 0.05° C./sec, 0.01° C./sec, or other similar values.

The memory 138 also includes a reductant module 174 (e.g., circuit, etc.). The reductant module 174 stores a maximum reductant flow rate threshold $R_{rmax}$, a minimum reductant flow rate threshold $R_{rmin}$, a maximum reductant amount threshold $R_{omax}$, and a minimum reductant amount threshold $R_{omin}$. The $R_{rmax}$, the $R_{rmin}$, the $R_{omax}$, and the $R_{omin}$ may be provided to the memory 138 or may be determined by the processing circuit 134 via machine learning. The $R_{rmin}$ may be approximately equal to 0.05 milliliter per second (ml/sec), 0.1 ml/sec, 0.15 ml/sec, or other similar values. The $R_{rmax}$ may be approximately equal to $$0.7 \le \frac{\frac{F_r * \rho_r * \tau}{L}}{A_{upstream}} \le 2 \qquad (2)$$

or other similar values, where $\tau$ is the concentration of urea in the reductant, $\rho_r$ is the density of the reductant, where L is the product of the molecular weight of the reductant to the reductant to ammonia molar ratio. In some embodiments, the $\tau$ may be approximately equal to 0.295, 0.30, 0.305, 0.31, 0.315, 0.32, 0.325, 0.33, 0.335, 0.34, 0.345, 0.35, or other similar values. In some embodiments, the $\rho_r$ may be approximately equal to 1090 kilogram per cubic meter. In some embodiments, the L may be approximately equal to 0.001 moles per second, 0.002 moles per second, 0.003 moles per second, 0.004 moles per second, 0.005 moles per second, 0.006 moles per second, 0.007 moles per second, 0.008 moles per second, or other similar values. The $R_{omax}$ and $R_{omin}$ depend upon $T_{conversion}$ and may be determined by experimentation and observation. In some embodiments, the $R_{omax}$ may be approximately equal to 10 ml, 15 ml, 20 ml, 25 ml, 30 ml, or other similar values. In some embodiments, the $R_{omin}$ may be approximately equal to 10 ml, 15 ml, 20 ml, 25 ml, 30 ml, or other similar values. In some embodiments, the $R_{omin}$ may be approximately equal to the $R_{omax}$, the $R_{omax}$ less 5 ml, or other similar values.

The memory 138 also includes a NO$_x$ module 176 (e.g., circuit, etc.). The NO$_x$ module 176 stores a maximum upstream NO$_x$ amount threshold $R_{omax}$, a minimum upstream NO$_x$ amount threshold $R_{umin}$, and a volume $V_{conversion}$ of the conversion catalyst 116. The $R_{omax}$, the $R_{umin}$, the $V_{conversion}$ may be provided to the memory 138 or may be determined by the processing circuit 134 via machine learning. The $R_{omax}$ may be approximately equal to 1400 ppm, 1450 ppm, 1500 ppm, 1550 ppm, 1600 ppm, or other similar values. The Rum, may be approximately equal to 25 ppm, 35 ppm, 50 ppm, 65 ppm, 75 ppm, or other similar values.

The memory 138 also includes a weight module 178 (e.g., circuit, etc.). The weight module 178 stores a first bucket counter weight $W_1$ and a second bucket counter weight $W_2$. The $W_1$ and the $W_2$ may be provided to the memory 138 or may be determined by the processing circuit 134 via machine learning. The $W_1$ may be approximately equal to 1, 2, 3, 5, 8, 10, or other similar values. The $W_2$ may be approximately equal to 1, 2, 3, 5, 8, 10, or other similar values. The $W_2$ may be the same as, or different from, the $W_1$.

The memory 138 also includes an age module 180 (e.g., circuit, etc.). The age module 180 stores age information relating to the conversion catalyst 116. The memory 138 also includes a fuel module 182 (e.g., circuit, etc.). The fuel module 182 stores a fuel consumption rate $U_{fuel}$ and a normalized fuel consumption threshold $R_{fuel}$. The $U_{fuel}$ and the $R_{fuel}$ may be provided to the memory 138 or may be determined by the processing circuit 134 via machine learning. The $U_{fuel}$ may be approximately equal to 0.380 pounds per horsepower hour (lbs/hp hour), 0.450 lbs/hp hour, or other similar values.

While the fuel analysis system 148 has been illustrated herein as communicating with the exhaust gas aftertreatment system controller 132, it is understood that the fuel analysis system 148 could additionally or alternatively communicate with other controllers, such as a controller dedicated to the fuel analysis system 148.

The upstream NO$_x$ sensor 150 may be a Continental 2.8 NO$_x$ sensor, a Continental 2.0 NO$_x$ sensor, or a Bosch 4.0 NO$_x$ sensor. The downstream NO$_x$ sensor 152 may be a Continental 2.8 NO$_x$ sensor, a Continental 2.0 NO$_x$ sensor, or a Bosch 4.0 NO$_x$ sensor.

While the temperature sensor 156 is shown and described as being configured to determine a temperature of the conversion catalyst 116, it is understood that an additional temperature sensor may be included that is configured to determine a temperature of the oxidation catalyst 111. In some of these applications, the temperature sensor 156 may be omitted and the fuel analysis system 148 operates based on the temperature of the oxidation catalyst 111 and not based on the temperature of the conversion catalyst 116. In others of these applications, the fuel analysis system 148 operates based on the temperature of the oxidation catalyst 111 and based on the temperature of the conversion catalyst 116.

IV. Overview of Fuel Analysis Process

FIGS. 2-15 illustrate an example fuel analysis process 200 (e.g., method, procedure, etc.) implemented in the vehicle system 100. The fuel analysis process 200 starts in block 202 with clearing (e.g., deleting the contents of, setting the contents of to 0, etc.), by the exhaust gas aftertreatment system controller 132, the $B_1$, the $B_2$, the $Y_1$, the $Y_2$, the $C_{B1}$, and the $C_{B2}$. The $B_1$, the $B_2$, the $Y_1$, the $Y_2$, the $C_{B1}$, and the $C_{B2}$ are each utilized by the exhaust gas aftertreatment system controller 132 in at least one calculation to determine if a signal should be communicated (e.g., sent, transmitted, etc.) to the indication device 142 to cause the indication device 142 to be in the static state, the impure fuel alarm state, or the age alarm state.

The fuel analysis process 200 continues in block 204 with clearing, by the exhaust gas aftertreatment system controller 132, the α, the Ω, and the φ. The α, the Ω, and the φ are each utilized by the exhaust gas aftertreatment system controller 132 in at least one calculation to determine if a signal should be communicated to the indication device 142 to cause the indication device 142 to be in the static state, the impure fuel alarm state, or the age alarm state. The fuel analysis process 200 continues in block 206 with increasing, by the exhaust gas aftertreatment system controller 132 the α by one.

The fuel analysis process 200 then progresses through an abort condition check process 208 (e.g., method, procedure, etc.). The abort condition check process 208 starts in block 210 with querying, by the exhaust gas aftertreatment system controller 132, the ignition device 146 to determine if the ignition device is in the off position. If the exhaust gas aftertreatment system controller 132 determines that the ignition device 146 is in the off position, then the abort condition check process 208 ends and the fuel analysis process 200 continues to block 202 (e.g., is re-run, etc.).

If the exhaust gas aftertreatment system controller 132 determines that the ignition device 146 is not in the off position (e.g., the ignition device 146 is in the on position, etc.), then the abort condition check process 208 continues in block 212 with determining, by the exhaust gas aftertreatment system controller 132, if the $A_{downstream}$ is greater than the $R_{downstream}$. The $A_{downstream}$ and the $R_{downstream}$ are each utilized by the exhaust gas aftertreatment system controller 132 in at least one calculation to determine if a signal should be communicated to the indication device 142 to cause the indication device 142 to be in the static state, the impure fuel alarm state, or the age alarm state.

If the $A_{downstream}$ is greater than the $R_{downstream}$, then the abort condition check process 208 ends and the fuel analysis process 200 continues to block 202. In some embodiments, the fuel analysis process 200 includes, after block 212 and before block 202, causing, by the exhaust gas aftertreatment system controller 132, the indication device 142 to change state (e.g., from the static state to an alarm state, etc.), and/or causing, by the exhaust gas aftertreatment system controller 132, the internal combustion engine 108 to halt or alter operation, in response to the $A_{downstream}$ being greater than the $R_{downstream}$.

If the exhaust gas aftertreatment system controller 132 determines that $A_{downstream}$ is not greater than the $R_{downstream}$, then the abort condition check process 208 continues in block 214 with receiving the $A_{upstream}$, the $A_{downstream}$, and determining, by the exhaust gas aftertreatment system controller 132, the C according to Equation (1). The $A_{upstream}$, the $A_{downstream}$, and the C are each utilized by the exhaust gas aftertreatment system controller 132 in at least one calculation to determine if a signal should be communicated to the indication device 142 to cause the indication device 142 to be in the static state, the impure fuel alarm state, or the age alarm state.

The abort condition check process 208 continues in block 216 with determining, by the exhaust gas aftertreatment system controller 132, if the C is less than the Renin. The $R_{cmin}$ is utilized by the exhaust gas aftertreatment system controller 132 in at least one calculation to determine if a signal should be communicated to the indication device 142 to cause the indication device 142 to be in the static state, the impure fuel alarm state, or the age alarm state.

If the C is less than the $R_{cmin}$, then the abort condition check process 208 ends and the fuel analysis process 200 continues to block 202. In some embodiments, the fuel analysis process 200 includes, after block 216 and before block 202, causing, by the exhaust gas aftertreatment system controller 132, the indication device 142 to change state (e.g., from the static state to an alarm state, etc.), and/or causing, by the exhaust gas aftertreatment system controller 132, the internal combustion engine 108 to halt or alter operation, in response to the C being less than the $R_{cmin}$.

If the exhaust gas aftertreatment system controller 132 determines that C is not less than the $R_{cmin}$ (e.g., the C is equal to the $R_{cmin}$, the C is greater than the $R_{cmin}$, etc.), then the abort condition check process 208 continues in block 218 with querying, by the exhaust gas aftertreatment system controller 132, the input device 144 to determine if the input device 144 is in the override operating mode. If the exhaust gas aftertreatment system controller 132 determines that the input device 144 is in the override operating mode, then the abort condition check process 208 ends and the fuel analysis process 200 continues to block 202.

If the exhaust gas aftertreatment system controller 132 determines that the input device 144 is not in the override operating mode (e.g., the exhaust gas aftertreatment system controller 132 determines that the input device 144 is in the normal operating mode, etc.), then the abort condition check process 208 continues in block 220 with determining, by the exhaust gas aftertreatment system controller 132 if the α is less than the $R_\alpha$. If the α is not less than the $R_\alpha$ (e.g., the α is equal to the $R_\alpha$, the α is greater than the $R_\alpha$, etc.), then the abort condition check process 208 ends and the fuel analysis process 200 continues to block 202. In this way, the $R_\alpha$ establishes a diagnostic window (e.g., evaluation window, sample window, etc.) within which the fuel analysis process 200 may continue beyond block 220.

If the exhaust gas aftertreatment system controller 132 determines that the α is less than the $R_\alpha$, then the abort condition check process 208 ends and the fuel analysis process 200 continues with an enable condition check process 222 (e.g., method, procedure, etc.). The enable condition check process 222 starts in block 224 with querying, by the exhaust gas aftertreatment system controller 132, the upstream $NO_x$ sensor 150 to determine if the upstream $NO_x$ sensor 150 is operational (e.g., the exhaust gas aftertreatment system controller 132 determines if the upstream $NO_x$ sensor 150 is providing an error, etc.). If the exhaust gas aftertreatment system controller 132 determines that the upstream $NO_x$ sensor 150 is not operational (e.g., the exhaust gas aftertreatment system controller 132 determines that the upstream $NO_x$ sensor 150 is providing an error, etc.), then the enable condition check process 222 ends and the fuel analysis process 200 continues to block 206.

If the exhaust gas aftertreatment system controller 132 determines that the upstream $NO_x$ sensor 150 is operational (e.g., the exhaust gas aftertreatment system controller 132 determines that the upstream $NO_x$ sensor 150 is not providing an error, etc.), then the enable condition check process 222 continues in block 226 with querying, by the exhaust gas aftertreatment system controller 132, the downstream $NO_x$ sensor 152 to determine if the downstream $NO_x$ sensor 152 is operational (e.g., the exhaust gas aftertreatment system controller 132 determines if the downstream $NO_x$ sensor 152 is providing an error, etc.). If the exhaust gas aftertreatment system controller 132 determines that the downstream $NO_x$ sensor 152 is not operational (e.g., the exhaust gas aftertreatment system controller 132 determines that the downstream NO$_x$ sensor 152 is providing an error, etc.), then the enable condition check process 222 ends and the fuel analysis process 200 continues to block 206.

If the exhaust gas aftertreatment system controller 132 determines that the downstream NO$_x$ sensor 152 is operational (e.g., the exhaust gas aftertreatment system controller 132 determines that the downstream NO$_x$ sensor 152 is not providing an error, etc.), then the enable condition check process 222 continues in block 228 with querying, by the exhaust gas aftertreatment system controller 132, the temperature sensor 156 to determine if the temperature sensor 156 is operational (e.g., the exhaust gas aftertreatment system controller 132 determines if the temperature sensor 156 is providing an error, etc.). If the exhaust gas aftertreatment system controller 132 determines that the temperature sensor 156 is not operational (e.g., the exhaust gas aftertreatment system controller 132 determines that the temperature sensor 156 is providing an error, etc.), then the enable condition check process 222 ends and the fuel analysis process 200 continues to block 206.

If the exhaust gas aftertreatment system controller 132 determines that the temperature sensor 156 is operational (e.g., the exhaust gas aftertreatment system controller 132 determines that the temperature sensor 156 is not providing an error, etc.), then the enable condition check process 222 continues in block 230 with receiving the Fe and then determining, by the exhaust gas aftertreatment system controller 132, if the Fe is less than the R$_{emax}$. The Fe and the R$_{emax}$ are each utilized by the exhaust gas aftertreatment system controller 132 in at least one calculation to determine if a signal should be communicated to the indication device 142 to cause the indication device 142 to be in the static state, the impure fuel alarm state, or the age alarm state. If the Fe is not less than the R$_{emax}$ (e.g., the Fe is equal to the R$_{emax}$, the Fe is greater than the R$_{emax}$, etc.), then the enable condition check process 222 ends and the fuel analysis process 200 continues to block 206.

If the exhaust gas aftertreatment system controller 132 determines that the Fe is less than the R$_{emax}$, then the enable condition check process 222 continues in block 232 with determining, by the exhaust gas aftertreatment system controller 132, if the Fe is greater than the R$_{emin}$. The R$_{emin}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the Fe is not greater than the R$_{emin}$ (e.g., the Fe is equal to the R$_{emin}$, the Fe is less than the R$_{emin}$, etc.), then the enable condition check process 222 ends and the fuel analysis process 200 continues to block 206.

If the exhaust gas aftertreatment system controller 132 determines that the Fe is greater than the R$_{emin}$, then the enable condition check process 222 continues in block 225 with indexing, by the exhaust gas aftertreatment system controller 132, the Fe with the α. The enable condition check process 222 continues in block 227 with determining, by the exhaust gas aftertreatment system controller 132, a change in the Fe, $\Delta_{Fe}$. The $\Delta_{Fe}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the $\Delta_{Fe}$ is determined by subtracting the Fe for the previous global counter α−1 from the Fe at the α. Where the α is equal to 1, the Fe for the previous global counter α−1 is equal to zero.

$$\Delta_{Fe} = F_{e,\alpha} - F_{e,\alpha-1} \quad (3)$$

The enable condition check process 222 continues in block 229 with determining, by the exhaust gas aftertreatment system controller 132, if the $\Delta_{Fe}$ is less than the R$_{\Delta emax}$. The R$_{\Delta emax}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $\Delta_{Fe}$ is not less than the R$_{\Delta emax}$ (e.g., the $\Delta_{Fe}$ is equal to the R$_{\Delta emax}$, the $\Delta_{Fe}$ is greater than the R$_{\Delta emax}$, etc.), then the enable condition check process 222 ends and the fuel analysis process 200 continues to block 206.

If the exhaust gas aftertreatment system controller 132 determines that the $\Delta_{Fe}$ is less than the R$_{\Delta emax}$, then the enable condition check process 222 continues in block 231 with determining, by the exhaust gas aftertreatment system controller 132, if the $\Delta_{Fe}$ is greater than the R$_{\Delta emin}$. The R$_{\Delta emin}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $\Delta_{Fe}$ is not greater than the R$_{\Delta emin}$ (e.g., the $\Delta_{Fe}$ is equal to the R$_{\Delta emin}$, the $\Delta_{Fe}$ is less than the R$_{\Delta emin}$, etc.), then the enable condition check process 222 ends and the fuel analysis process 200 continues to block 206.

If the exhaust gas aftertreatment system controller 132 determines that the $\Delta_{Fe}$ is greater than the R$_{\Delta emin}$, then the enable condition check process 222 continues in block 234 with receiving the Fr and then determining, by the exhaust gas aftertreatment system controller 132, if the Fr is less than the R$_{rmax}$. The Fr and R$_{rmax}$ are each utilized by the exhaust gas aftertreatment system controller 132 in at least one calculation to determine if a signal should be communicated to the indication device 142 to cause the indication device 142 to be in the static state, the impure fuel alarm state, or the age alarm state. If the Fr is not less than the R$_{rmax}$ (e.g., the Fr is equal to the R$_{rmax}$, the Fr is greater than the R$_{rmax}$, etc.), then the enable condition check process 222 ends and the fuel analysis process 200 continues to block 206.

If the exhaust gas aftertreatment system controller 132 determines that the Fr is less than the R$_{rmax}$, then the enable condition check process 222 continues in block 236 with determining, by the exhaust gas aftertreatment system controller 132, if the Fr is greater than the R$_{rmin}$. The R$_{rmin}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the Fr is not greater than the R$_{rmin}$ (e.g., the Fr is equal to the % min, the Fr is less than the R$_{rmin}$, etc.), then the enable condition check process 222 ends and the fuel analysis process 200 continues to block 206.

If the exhaust gas aftertreatment system controller 132 determines that the Fr is greater than the R$_{rmin}$, then the enable condition check process 222 continues in block 238 with determining, by the exhaust gas aftertreatment system controller 132, an incremental reductant amount σ provided into the exhaust gas since a previous global counter α−1. The σ is utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the α is determined $$\sigma = \int_{a-1}^{a} F_r \qquad (4)$$

by integrating the Fr from α−1 to α. Where the α is equal to 0, the α is equal to zero. The Fr is a function of time and is therefore a function of the α. It is understood that the Equation (4) includes a correlation between time and the α. The enable condition check process 222 continues in block 239 with indexing, by the exhaust gas aftertreatment system controller 132, the α with the α.

The enable condition check process 222 then continues in block 240 with determining, by the exhaust gas aftertreatment system controller 132, a total reductant amount S provided into the exhaust gas as of the α. The S is utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the S is determined $$S = \sum_{a=1}^{\alpha} \sigma_a \qquad (5)$$

by adding the $\sigma_\alpha$ for each value of α.

The enable condition check process 222 continues in block 242 with determining, by the exhaust gas aftertreatment system controller 132, if the S is less than the $R_{\sigma max}$. The $R_{\sigma max}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the S is not less than the $R_{\sigma max}$ (e.g., the S is equal to the $R_{\sigma max}$, the S is greater than the $R_{\sigma max}$, etc.), then the enable condition check process 222 ends and the fuel analysis process 200 continues to block 206.

If the exhaust gas aftertreatment system controller 132 determines that the S is less than the $R_{\sigma max}$, then the enable condition check process 222 continues in block 244 with determining, by the exhaust gas aftertreatment system controller 132, if the S is greater than the $R_{\sigma min}$. The $R_{\sigma min}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the S is not greater than the $R_{\sigma min}$ (e.g., the S is equal to the $R_{\sigma min}$, the S is less than the $R_{\sigma min}$, etc.), then the enable condition check process 222 ends and the fuel analysis process 200 continues to block 206. Through the blocks 238, 240, 242, and 244, the exhaust gas aftertreatment system controller 132 determines if the conversion catalyst 116 has adequate storage (e.g., for ammonia ($NH_3$), etc.) in order to proceed with the fuel analysis process 200.

If the exhaust gas aftertreatment system controller 132 determines that the S is greater than the $R_{\sigma min}$, then the enable condition check process 222 continues in block 246 with determining, by the exhaust gas aftertreatment system controller 132, if the $A_{upstream}$ is less than the $R_{\sigma max}$. The $R_{\sigma max}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $A_{upstream}$ is not less than the $R_{\sigma max}$ (e.g., the $A_{upstream}$ is equal to the $R_{\sigma max}$, the $A_{upstream}$ is greater than the $R_{\sigma max}$, etc.), then the enable condition check process 222 ends and the fuel analysis process 200 continues to block 206.

If the exhaust gas aftertreatment system controller 132 determines that the $A_{upstream}$ is less than the $R_{umax}$, then the enable condition check process 222 continues in block 248 with determining, by the exhaust gas aftertreatment system controller 132, if the $A_{upstream}$ is greater than the $R_{umin}$. The $R_{umin}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $A_{upstream}$ is not greater than the $R_{umin}$ (e.g., the $A_{upstream}$ is equal to the $R_{umin}$, the $A_{upstream}$ is less than the $R_{umin}$, etc.), then the enable condition check process 222 ends and the fuel analysis process 200 continues to block 206.

If the $A_{upstream}$ is greater than the $R_{umin}$, then the enable condition check process 222 continues in block 250 with determining, by the exhaust gas aftertreatment system controller 132, the $T_{conversion}$ and indexing the $T_{conversion}$ with the α. The $T_{conversion}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. The enable condition check process 222 continues in block 252 with determining, by the exhaust gas aftertreatment system controller 132, a temperature change of the conversion catalyst Δ. The Δ is utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the Δ is determined $$\Delta = T_{conversion,\alpha} - T_{conversion,\alpha-1} \qquad (6)$$

by subtracting the $T_{conversion}$ for the previous global counter α−1 from the $T_{conversion}$ at the α. Where the α is equal to 1, the $T_{conversion}$ for the previous global counter α−1 is equal to zero.

The enable condition check process 222 continues in block 254 with determining, by the exhaust gas aftertreatment system controller 132, if the Δ is less than the $R_{\Delta T}$. The $R_{\Delta T}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the exhaust gas aftertreatment system controller 132 determines that the Δ is not less than the RAT, then the enable condition check process 222 continues in block 256 with increasing, by the exhaust gas aftertreatment system controller 132 the Ω by 1. If the exhaust gas aftertreatment system controller 132 determines that the A is less than the RAT, then the enable condition check process 222 continues in block 258 with clearing, by the exhaust gas aftertreatment system controller 132 the Ω (e.g., setting the Ω equal to 0, etc.).

The enable condition check process 222 continues in block 260 with determining, by the exhaust gas aftertreatment system controller 132, if the Ω is less than the $R_\Omega$. If the exhaust gas aftertreatment system controller 132 determines that the Ω is less than the $R_\Omega$, then the enable condition check process 222 ends and the fuel analysis process 200 continues to block 206.

If the exhaust gas aftertreatment system controller 132 determines that the Ω is not less than the $R_\Omega$, then the enable condition check process 222 ends and the fuel analysis process 200 continues with a temperature analysis process 262 (e.g., method, procedure, etc.). The temperature analysis process 262 begins in block 264 with determining, by the exhaust gas aftertreatment system controller 132, if the $T_{conversion}$ is greater than the $R_{LT}$. The $R_{LT}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $T_{conversion}$ is not greater than the $R_{LT}$ (e.g., the $T_{conversion}$ is equal to the $R_{LT}$, the $T_{conversion}$ is less than the $R_{LT}$, etc.), the temperature analysis process 262 ends and the fuel analysis process 200 continues to block 206.

If the $T_{conversion}$ is greater than the $R_{LT}$, the temperature analysis process 262 continues in block 266 with determining, by the exhaust gas aftertreatment system controller 132, if the $T_{conversion}$ is less than the $R_{UT}$. The $R_{UT}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $T_{conversion}$ is not less than the $R_{UT}$ (e.g., the $T_{conversion}$ is equal to the $R_{UT}$, the $T_{conversion}$ is greater than the $R_{UT}$, etc.), the temperature analysis process 262 ends and the fuel analysis process 200 continues to block 206.

If the $T_{conversion}$ is less than the $R_{UT}$, the temperature analysis process 262 continues in block 268 with determining, by the exhaust gas aftertreatment system controller 132, if the $T_{conversion}$ is less than the $R_{MT}$. The $R_{MT}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $T_{conversion}$ is less than the $R_{MT}$, the temperature analysis process 262 continues in block 270 with increasing, by the exhaust gas aftertreatment system controller 132, the $B_1$ by the $W_1$. The $W_1$ is utilized by the exhaust gas aftertreatment system controller 132 in at least one calculation to determine if a signal should be communicated to the indication device 142 to cause the indication device 142 to be in the static state, the impure fuel alarm state, or the age alarm state. The temperature analysis process 262 continues in block 272 with increasing, by the exhaust gas aftertreatment system controller 132, the $Y_1$ by 1. The temperature analysis process 262 continues in block 274 with increasing, by the exhaust gas aftertreatment system controller 132 the $C_{B1}$ by the C.

If the $T_{conversion}$ is not less than the $R_{MT}$ (e.g., the $T_{conversion}$ is equal to the $R_{MT}$, the $T_{conversion}$ is greater than the $R_{MT}$, etc.), the temperature analysis process 262 continues in block 275 with determining, by the exhaust gas aftertreatment system controller 132, if the Δ is greater than the $R_{\Delta Tslip}$. If the Δ is greater than the $R_{\Delta Tslip}$, the temperature analysis process 262 ends and the fuel analysis process 200 continues to block 206. However, if the A is not greater than the $R_{\Delta Tslip}$ (e.g., the Δ is equal to the $R_{\Delta Tslip}$, the Δ is less than the $R_{\Delta Tslip}$), the temperature analysis process continues in block 276 with increasing, by the exhaust gas aftertreatment system controller 132, the $B_2$ by the $W_2$. The $W_2$ is utilized by the exhaust gas aftertreatment system controller 132 in at least one calculation to determine if a signal should be communicated to the indication device 142 to cause the indication device 142 to be in the static state, the impure fuel alarm state, or the age alarm state. The temperature analysis process 262 continues in block 278 with increasing, by the exhaust gas aftertreatment system controller 132, the $Y_2$ by 1. The temperature analysis process 262 continues in block 280 with increasing, by the exhaust gas aftertreatment system controller 132 the $C_{B2}$ by the C.

The temperature analysis process 262 continues in block 282 with determining, by the exhaust gas aftertreatment system controller 132 if the $B_1$ is less than the $R_{B1}$. If the $B_1$ is less than the $R_{B1}$, the temperature analysis process 262 ends and the fuel analysis process 200 continues to block 206.

If the $B_1$ is not less than the $R_{B1}$ (e.g., the $B_1$ is equal to the $R_{B1}$, the $B_1$ is greater than the $R_{B1}$, etc.), the temperature analysis process 262 continues in block 284 with determining, by the exhaust gas aftertreatment system controller 132 if the $B_2$ is less than the $R_{B2}$. If the $B_2$ is less than the $R_{B2}$, the temperature analysis process 262 ends and the fuel analysis process 200 continues to block 206.

If the $B_2$ is not less than the $R_{B2}$ (e.g., the $B_2$ is equal to the $R_{B2}$, the $B_2$ is greater than the $R_{B2}$, etc.), the temperature analysis process 262 ends and the fuel analysis process 200 continues with a conversion efficiency analysis process 286 (e.g., method, procedure, etc.). The conversion efficiency analysis process 286 begins in block 288 with determining, by the exhaust gas aftertreatment system controller 132, an average first bucket conversion efficiency $C_{AB1}$. The $C_{AB1}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the $C_{AB1}$ is calculated by $$C_{AB1} = \frac{C_{B1}}{Y_1} \qquad (7)$$

dividing the $C_{B1}$ by the $Y_1$. The conversion efficiency analysis process 286 continues in block 290 with determining, by the exhaust gas aftertreatment system controller 132, if the $C_{AB1}$ is greater than the $R_{CB1}$.

If the $C_{AB1}$ is greater than the $R_{CB1}$, the conversion efficiency analysis process 286 continues in block 292 with determining, by the exhaust gas aftertreatment system controller 132, an average second bucket conversion efficiency $C_{AB2}$. The $C_{AB2}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the $C_{AB2}$ is calculated by $$C_{AB2} = \frac{C_{B2}}{Y_2} \qquad (8)$$

dividing the $C_{B2}$ by the $Y_2$.

The conversion efficiency analysis process 286 continues in block 294 with determining, by the exhaust gas aftertreatment system controller 132, if the $C_{AB2}$ is greater than the $R_{CB2}$. If the $C_{AB2}$ is greater than the $R_{CB2}$, the conversion efficiency analysis process 286 continues in block 296 with clearing, by the exhaust gas aftertreatment system controller 132, an impure fuel flag (e.g., removing the impure fuel flag, setting the impure fuel flag to 0, etc.). As is explained in more detail herein, when the impure fuel flag is set (e.g., the impure fuel flag is present, the impure fuel flag is set to 0, etc.), the exhaust gas aftertreatment system controller 132 communicates with the central controller 140 to cause the indication device 142 to be in the impure fuel alarm state. The conversion efficiency analysis process 286 then ends and the fuel analysis process 200 continues to block 206.

If the $C_{AB1}$ is not greater than the $R_{CB1}$ (e.g., the $C_{AB1}$ is equal to the $R_{CB1}$, the $C_{AB1}$ is less than the $R_{CB1}$, etc.) and/or the $C_{AB2}$ is not greater than the $R_{CB2}$ (e.g., the $C_{AB2}$ is equal to the $R_{CB2}$, the $C_{AB2}$ is less than the $R_{CB2}$, etc.), the conversion efficiency analysis process 286 ends and the fuel analysis process 200 continues with a regeneration analysis process 298 (e.g., method, procedure, etc.). As is explained in more detail herein, the regeneration analysis process 298 is utilized to determine if (i) the oxidation catalyst 111 and/or the conversion catalyst 116 are aged and/or (ii) if the oxidation catalyst 111 and/or the conversion catalyst 116 have more than the threshold amount of accumulation on them (e.g., are sulfated, are contaminated with sulfur, etc.).

The regeneration analysis process 298 begins in block 300 with determining, by the exhaust gas aftertreatment system controller 132, if the $T_{conversion}$ is less than the regeneration temperature $T_{regeneration}$. In this way, the regeneration analysis process 298 is capable of determining if a regeneration cycle is being performed at the α. If the $T_{conversion}$ is not less than the $T_{regeneration}$, the regeneration analysis process 298 continues in block 302 with setting, by the exhaust gas aftertreatment system controller 132 the φ equal to the α. The regeneration analysis process 298 then ends and the fuel analysis process 200 continues to block 206.

If the $T_{conversion}$ is less than the $T_{regeneration}$, the regeneration analysis process 298 continues in block 304 with determining, by the exhaust gas aftertreatment system controller 132, if the φ is equal to 0. In this way, the regeneration analysis process 298 can determine if a regeneration cycle has been performed.

If the φ is not equal to 0, the regeneration analysis process 298 continues in block 306 with determining, by the exhaust gas aftertreatment system controller 132, if φ is within the $R_\varphi$ of α. The $R_\varphi$ is utilized by the exhaust gas aftertreatment system controller 132 in at least one calculation to determine if a signal should be communicated to the indication device 142 to cause the indication device 142 to be in the static state, the impure fuel alarm state, or the age alarm state. In this way, the regeneration analysis process 298 is capable of determining if the most recent regeneration cycle was performed so long ago that it should be ignored. In some embodiments, block 306 may be represented by $$\varphi - R_\varphi \leq \alpha \leq \varphi + R_\varphi \quad (9)$$

when the φ is within the $R_\varphi$ of the α.

If the φ is equal to 0 or the φ is not within the $R_\varphi$ of the α (e.g., if Equation (9) is not true, etc.), the regeneration analysis process 298 then continues in block 308 with determining, by the exhaust gas aftertreatment system controller 132, if the $T_{conversion}$ is greater than the $R_{Tpre}$.

If the $T_{conversion}$ is not greater than the $R_{Tpre}$ (e.g., the $T_{conversion}$ is less than the $R_{Tpre}$, the $T_{conversion}$ is equal to the $R_{Tpre}$), the regeneration analysis process 298 then continues in block 310 with determining, by the exhaust gas aftertreatment system controller 132, if the C is greater than the $R_{Cprelow}$. If the C is not greater than the $R_{Cprelow}$ (e.g., the C is equal to the $R_{Cprelow}$, the C is less than the $R_{Cprelow}$) the regeneration analysis process 298 continues in block 312 with setting, by the exhaust gas aftertreatment system controller 132, a pre-regeneration low temperature flag to 1. The regeneration analysis process 298 then ends and the fuel analysis process 200 continues to block 206.

If the C is greater than the $R_{Cprelow}$, the regeneration analysis process 298 continues in block 314 with clearing, by the exhaust gas aftertreatment system controller 132, the impure fuel flag (e.g., removing the impure fuel flag, setting the impure fuel flag to 0, etc.). The regeneration analysis process 298 then ends and the fuel analysis process 200 continues to block 206.

If the $T_{conversion}$ is greater than the $R_{Tpre}$, the regeneration analysis process 298 then continues in block 316 with determining, by the exhaust gas aftertreatment system controller 132, if the C is less than the $R_{Cprehigh}$. If the C is not less than the $R_{Cprehigh}$ (e.g., the C is equal to the $R_{Cprehigh}$, the C is greater than the $R_{Cprehigh}$) the regeneration analysis process 298 continues in block 318 with setting, by the exhaust gas aftertreatment system controller 132, a pre-regeneration high temperature flag to 1. The regeneration analysis process 298 then ends and the fuel analysis process 200 continues to block 206.

If the C is less than the $R_{Cprehigh}$, the regeneration analysis process 298 continues in block 320 with clearing, by the exhaust gas aftertreatment system controller 132, the impure fuel flag (e.g., removing the impure fuel flag, setting the impure fuel flag to 0, etc.). The regeneration analysis process 298 then ends and the fuel analysis process 200 continues to block 206.

If the φ is within the $R_\varphi$ of the α (e.g., if Equation (9) is true, etc.), the regeneration analysis process 298 continues in block 322 with determining, by the exhaust gas aftertreatment system controller 132, if the pre-regeneration low temperature flag is equal to one. If the pre-regeneration low temperature flag is not equal to 1, the regeneration analysis process 298 then ends and the fuel analysis process 200 continues to block 206. If the pre-regeneration low temperature flag is equal to one, the regeneration analysis process 298 continues in block 324 with determining, by the exhaust gas aftertreatment system controller 132, if the pre-regeneration high temperature flag is equal to one. If the pre-regeneration high temperature flag is not equal to 1, the regeneration analysis process 298 then ends and the fuel analysis process 200 continues to block 206.

The regeneration analysis process 298 then continues in block 326 with determining, by the exhaust gas aftertreatment system controller 132, if the $T_{conversion}$ is greater than the $R_{Tpost}$.

If the $T_{conversion}$ is greater than the $R_{Tpost}$, the regeneration analysis process 298 then continues in block 328 with determining, by the exhaust gas aftertreatment system controller 132, if the C is greater than the $R_{Cposthigh}$. If the C is not greater than the $R_{Cposthigh}$ (e.g., the C is equal to the $R_{Cposthigh}$, the C is less than the $R_{Cposthigh}$) the regeneration analysis process 298 continues in block 330 with clearing, by the exhaust gas aftertreatment system controller 132, the impure fuel flag (e.g., removing the impure fuel flag, setting the impure fuel flag to 0, etc.). If the C is greater than the $R_{Cposthigh}$, the exhaust gas aftertreatment system controller 132 does not clear the impure fuel flag. The regeneration analysis process 298 then ends and the fuel analysis process 200 continues to block 206.

If the $T_{conversion}$ is not greater than the $R_{Tpost}$ (e.g., the $T_{conversion}$ is less than the $R_{Tpost}$, the $T_{conversion}$ is equal to the $R_{Tpost}$), the regeneration analysis process 298 then continues in block 332 with determining, by the exhaust gas aftertreatment system controller 132, if the C is less than the $R_{Cpostlow}$. If the C is not less than the $R_{Cpostlow}$ (e.g., the C is equal to the $R_{Cpostlow}$, the C is greater than the $R_{Cpostlow}$) the regeneration analysis process 298 continues in block 334 with setting, by the exhaust gas aftertreatment system controller 132, the impure fuel flag to 1. This causes a communication to be sent to the central controller 140 which further relays the communication to the indication device 142. In response to receiving the communication indicating that the impure fuel flag is 1, the indication device 142 changes to the impure fuel alarm state, unless the indication device 142 was already in the impure fuel alarm state. The regeneration analysis process 298 then ends and the fuel analysis process 200 continues to block 206.

If the C is less than the $R_{Cpostlow}$, the regeneration analysis process 298 continues in block 336 with setting, by the exhaust gas aftertreatment system controller 132, an age flag to 1. This causes a communication to be sent to the central controller 140 which further relays the communication to the indication device 142. In response to receiving the communication indicating that the age flag is 1, the indication device 142 changes to the age alarm state, unless the indication device 142 was already in the age alarm state. The regeneration analysis process 298 continues in block 338 with clearing, by the exhaust gas aftertreatment system controller 132, the impure fuel flag (e.g., removing the impure fuel flag, setting the impure fuel flag to 0, etc.). The regeneration analysis process 298 then ends and the fuel analysis process 200 continues to block 206.

In some applications, such as those where relatively low load duty cycles are used, it may be difficult for the fuel analysis process 200 to cause the $B_1$ to exceed the $R_{B1}$ and the $B_2$ to exceed the $R_{B2}$. In such applications, the fuel analysis process 200 includes a low load process 700 (e.g., method, procedure, etc.) that begins when, in block 282, the $B_1$ is less than the $R_{B1}$ (rather than the fuel analysis process 200 continuing to block 206 from block 282) or when, in block 284, the $B_2$ is less than the $R_{B2}$ (rather than the fuel analysis process 200 continuing to block 206 from block 284).

The low load process 700 begins in block 702 with determining, by the exhaust gas aftertreatment system controller 132, if the $T_{conversion}$ is less than the $R_{regeneration}$. The $R_{regeneration}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. If the $T_{conversion}$ is not less than the $R_{regeneration}$ (e.g., the $T_{conversion}$ is equal to the $R_{regeneration}$, the $T_{conversion}$ is greater than the $R_{regeneration}$, etc.) the low load process 700 ends and the fuel analysis process 200 continues to block 206.

If the $T_{conversion}$ is less than the $R_{regeneration}$, the low load process 700 continues in block 704 with causing, by the exhaust gas aftertreatment system controller 132, a regeneration cycle to be performed. For example, the exhaust gas aftertreatment system controller 132 may communicate with the central controller 140 and cause the internal combustion engine 108 to be provided additional fuel. The low load process 700 then ends and the fuel analysis process 200 continues to block 206.

In some applications, the fuel analysis process 200 includes a normalization process 800 (e.g., method, procedure, etc.) that begins when, in block 284, the $B_2$ is less than the $R_{B2}$ (rather than the fuel analysis process 200 continuing to block 206 from block 284). The normalization process 800 begins in block 802 with determining, by the exhaust gas aftertreatment system controller 132, an incremental fuel consumption K since a previous global counter α−1 based on the $U_{fuel}$. The K and $U_{fuel}$ are each utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the K is determined $$K = \int_{\alpha-1}^{\alpha} U_{fuel} \tag{10}$$

by integrating the $U_{fuel}$ from α−1 to α. Where the α is equal to 0, the K is equal to zero. The $U_{fuel}$ is a function of time and is therefore a function of the α. It is understood that the Equation (10) includes a correlation between time and the α. The normalization process 800 continues in block 804 with indexing, by the exhaust gas aftertreatment system controller 132, the K with the α.

The normalization process 800 then continues in block 806 with determining, by the exhaust gas aftertreatment system controller 132, a total fuel consumption $X_{fuel}$ provided into the exhaust gas as of the α. The $X_{fuel}$ is utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, the $X_{fuel}$ is determined $$X_{fuel} = \sum_{\alpha=1}^{\alpha} K_\alpha \tag{11}$$

by adding the $K_\alpha$ for each value of α.

The normalization process 800 then continues in block 808 with determining, by the exhaust gas aftertreatment system controller 132, a normalized fuel consumption $N_{fuel}$ based on the $V_{conversion}$. The $N_{fuel}$ and $V_{conversion}$ are each utilized by the exhaust gas aftertreatment system controller 132 in at least one calculation to determine if a signal should be communicated to the indication device 142 to cause the indication device 142 to be in the static state, the impure fuel alarm state, or the age alarm state. In various embodiments, $N_{fuel}$ is determined $$N_{fuel} = \frac{X_{fuel}}{V_{conversion}} \tag{12}$$

by dividing the $X_{fuel}$ by the $V_{conversion}$.

The normalization process 800 then continues in block 810 with determining, by the exhaust gas aftertreatment system controller 132, if the $N_{fuel}$ is less than the $R_{fuel}$. If the $N_{fuel}$ is less than the $R_{fuel}$, then the normalization process 800 ends and the fuel analysis process 200 continues to block 206.

If the $N_{fuel}$ is not less than the $R_{fuel}$ (e.g., the $N_{fuel}$ is equal to the $R_{fuel}$, the $N_{fuel}$ is greater than the $R_{fuel}$, etc.), the normalization process 800 continues in block 812 with causing, by the exhaust gas aftertreatment system controller 132, a regeneration cycle to be performed. For example, the exhaust gas aftertreatment system controller 132 may communicate with the central controller 140 and cause the internal combustion engine 108 to be provided additional fuel. The normalization process 800 then ends and the fuel analysis process 200 continues to block 206. In other applications, the regeneration cycle could be caused to be performed in response to the fuel tank 110 be refilled or based on the C.

V. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. A vehicle system comprising:
   a conversion catalyst configured to receive exhaust gas;
   a temperature sensor configured to sense a conversion catalyst temperature of the conversion catalyst;
   an indication device operable between a static state and an impure fuel alarm state; and
   an exhaust gas aftertreatment system controller configured to:
   receive the conversion catalyst temperature from the temperature sensor;
   compare the conversion catalyst temperature to a conversion catalyst temperature lower threshold;
   compare the conversion catalyst temperature to a conversion catalyst temperature upper threshold;
   compare the conversion catalyst temperature to a conversion catalyst temperature middle threshold;
   increase a first bucket counter in response to determining that the conversion catalyst temperature is less than the conversion catalyst temperature middle threshold and greater than the conversion catalyst temperature lower threshold;
   increase a second bucket counter in response to determining that the conversion catalyst temperature is less than the conversion catalyst temperature upper threshold and equal to or greater than the conversion catalyst temperature middle threshold; and
   communicate a first signal to the indication device based on at least a calculation using the first bucket counter and the second bucket counter.

2. The vehicle system of claim 1, further comprising:
   an oxidation catalyst located upstream of the conversion catalyst, the oxidation catalyst being configured to receive the exhaust gas and provide the exhaust gas to the conversion catalyst;
   an upstream $NO_x$ sensor located upstream of the oxidation catalyst; and
   a downstream $NO_x$ sensor located downstream of the conversion catalyst;

wherein the exhaust gas aftertreatment system controller is further configured to:
receive an upstream $NO_x$ amount from the upstream $NO_x$ sensor;
receive a downstream $NO_x$ amount from the downstream $NO_x$ sensor;
determine a conversion efficiency based on the upstream $NO_x$ amount and the downstream $NO_x$ amount;
increase a first bucket total conversion efficiency by the conversion efficiency in response to increasing the first bucket counter; and
increase a second bucket total conversion efficiency by the conversion efficiency in response to increasing the second bucket counter; and
wherein the calculation that the first signal is based on additionally uses the first bucket total conversion efficiency and the second bucket total conversion efficiency.

3. The vehicle system of claim 2, wherein:
the exhaust gas aftertreatment system controller is further configured to:
compare the first bucket counter to a first bucket counter threshold;
compare the second bucket counter to a second bucket counter threshold in response to the first bucket counter not being less than the first bucket counter threshold;
determine an average first bucket conversion efficiency in response to the second bucket counter not being less than the second bucket counter threshold;
compare the average first bucket conversion efficiency to a first bucket conversion efficiency threshold;
determine an average second bucket conversion efficiency in response to the average first bucket conversion efficiency being greater than the first bucket conversion efficiency threshold; and
compare the average second bucket conversion efficiency to a second bucket conversion efficiency threshold;
the calculation that the first signal is based on additionally uses the average first bucket conversion efficiency and the average second bucket conversion efficiency.

4. The vehicle system of claim 3, wherein the exhaust gas aftertreatment system controller is further configured to cause the indication device to be in the static state in response to determining that the average second bucket conversion efficiency is greater than the second bucket conversion efficiency threshold.

5. The vehicle system of claim 4, wherein the exhaust gas aftertreatment system controller is further configured to determine if the conversion catalyst temperature is less than a pre-regeneration temperature threshold after determining that the average first bucket conversion efficiency is not greater than the first bucket conversion efficiency threshold or the average second bucket conversion efficiency is not greater than the second bucket conversion efficiency threshold.

6. The vehicle system of claim 5, wherein the exhaust gas aftertreatment system controller is further configured to:
determine if the conversion efficiency is greater than a pre-regeneration low temperature conversion efficiency threshold after determining that the conversion catalyst temperature is less than the pre-regeneration temperature threshold; and
determine if the conversion efficiency is less than a pre-regeneration high temperature conversion efficiency threshold after determining that the conversion catalyst temperature is greater than the pre-regeneration temperature threshold.

7. The vehicle system of claim 6, wherein the exhaust gas aftertreatment system controller is further configured to determine if the conversion catalyst temperature is less than a post-regeneration temperature threshold after determining that conversion efficiency is less than the pre-regeneration low temperature conversion efficiency threshold and that the conversion efficiency is greater than the pre-regeneration high temperature conversion efficiency threshold.

8. The vehicle system of claim 7, wherein:
the indication device is operable between the static state, the impure fuel alarm state, and an age alarm state; and
the exhaust gas aftertreatment system controller is further configured to:
determine if the conversion catalyst temperature is greater than a post-regeneration temperature threshold;
determine if the conversion efficiency is less than a post-regeneration low temperature conversion efficiency threshold after determining that the conversion catalyst temperature is less than the post-regeneration temperature threshold
cause the indication device to be in the impure fuel alarm state in response to determining that the conversion efficiency is greater than the post-regeneration low temperature conversion efficiency threshold; and
cause the indication device to be in the age alarm state in response to determining that the conversion efficiency is less than the post-regeneration low temperature conversion efficiency threshold.

9. An exhaust gas aftertreatment system controller for a vehicle system having a conversion catalyst, an oxidation catalyst, and an indication device, the exhaust gas aftertreatment system controller being configured to:
receive a conversion catalyst temperature associated with the conversion catalyst;
compare the conversion catalyst temperature to a conversion catalyst temperature lower threshold;
compare the conversion catalyst temperature to a conversion catalyst temperature upper threshold;
compare the conversion catalyst temperature to a conversion catalyst temperature middle threshold;
increase a first bucket counter in response to determining that the conversion catalyst temperature is less than the conversion catalyst temperature middle threshold and greater than the conversion catalyst temperature lower threshold;
increase a second bucket counter in response to determining that the conversion catalyst temperature is less than the conversion catalyst temperature upper threshold and equal to or greater than the conversion catalyst temperature middle threshold; and
communicate a first signal to the indication device based on at least a calculation using the first bucket counter and the second bucket counter.

10. The exhaust gas aftertreatment system controller of claim 9, further configured to:
receive an upstream $NO_x$ amount associated with exhaust gas upstream of the oxidation catalyst; and
receive a downstream $NO_x$ amount associated with exhaust gas downstream of the conversion catalyst;
determine a conversion efficiency based on the upstream $NO_x$ amount and the downstream $NO_x$ amount;

increase a first bucket total conversion efficiency by the conversion efficiency in response to increasing the first bucket counter; and increase a second bucket total conversion efficiency by the conversion efficiency in response to increasing the second bucket counter;

wherein the calculation that the first signal is based on additionally uses the first bucket total conversion efficiency and the second bucket total conversion efficiency.

11. The exhaust gas aftertreatment system controller of claim 10, further configured to:

compare the first bucket counter to a first bucket counter threshold;

compare the second bucket counter to a second bucket counter threshold in response to the first bucket counter being equal to or greater than the first bucket counter threshold;

determine an average first bucket conversion efficiency in response to the second bucket counter being equal to or greater than the second bucket counter threshold;

compare the average first bucket conversion efficiency to a first bucket conversion efficiency threshold;

determine an average second bucket conversion efficiency in response to the average first bucket conversion efficiency being greater than the first bucket conversion efficiency threshold; and compare the average second bucket conversion efficiency to a second bucket conversion efficiency threshold;

wherein the calculation that the first signal is based on additionally uses the average first bucket conversion efficiency and the average second bucket conversion efficiency.

12. The exhaust gas aftertreatment system controller of claim 11, further configured to communicate the first signal to the indication device in response to determining that the average second bucket conversion efficiency is greater than the second bucket conversion efficiency threshold, the first signal associated with a static state.

13. The exhaust gas aftertreatment system controller of claim 12, further configured to determine if the conversion catalyst temperature is less than a pre-regeneration temperature threshold after determining that the average first bucket conversion efficiency is not greater than the first bucket conversion efficiency threshold or the average second bucket conversion efficiency is not greater than the second bucket conversion efficiency threshold.

14. The exhaust gas aftertreatment system controller of claim 13, further configured to:

determine if the conversion efficiency is greater than a pre-regeneration low temperature conversion efficiency threshold after determining that the conversion catalyst temperature is less than the pre-regeneration temperature threshold; and determine if the conversion efficiency is less than a pre-regeneration high temperature conversion efficiency threshold after determining that the conversion catalyst temperature is greater than the pre-regeneration temperature threshold.

15. The exhaust gas aftertreatment system controller of claim 14, further configured to determine if the conversion catalyst temperature is less than a post-regeneration temperature threshold after determining that conversion efficiency is less than the pre-regeneration low temperature conversion efficiency threshold and that the conversion efficiency is greater than the pre-regeneration high temperature conversion efficiency threshold.

16. The exhaust gas aftertreatment system controller of claim 15, further configured to:

determine if the conversion catalyst temperature is greater than a post-regeneration temperature threshold;

determine if the conversion efficiency is less than a post-regeneration low temperature conversion efficiency threshold after determining that the conversion catalyst temperature is less than the post-regeneration temperature threshold cause the indication device to be in an impure fuel alarm state in response to determining that the conversion efficiency is greater than the post-regeneration low temperature conversion efficiency threshold; and cause the indication device to be in an age alarm state in response to determining that the conversion efficiency is less than the post-regeneration low temperature conversion efficiency threshold.

17. A method implemented with an indication device, the method comprising:

receiving an upstream $NO_x$ amount;

receiving a downstream $NO_x$ amount;

determining a conversion efficiency based on the upstream $NO_x$ amount and the downstream $NO_x$ amount;

increase a first bucket total conversion efficiency by the conversion efficiency;

increase a second bucket total conversion efficiency by the conversion efficiency;

comparing a first bucket counter to a first bucket counter threshold;

comparing a second bucket counter to a second bucket counter threshold in response to the first bucket counter not being less than the first bucket counter threshold;

determining an average first bucket conversion efficiency in response to the second bucket counter not being less than the second bucket counter threshold;

comparing the average first bucket conversion efficiency to a first bucket conversion efficiency threshold;

determining an average second bucket conversion efficiency in response to the average first bucket conversion efficiency being greater than the first bucket conversion efficiency threshold;

comparing the average second bucket conversion efficiency to a second bucket conversion efficiency threshold;

causing the indication device to be in a static state in response to determining that the average second bucket conversion efficiency is greater than the second bucket conversion efficiency threshold.

18. The method of claim 17, further comprising:

receiving a conversion catalyst temperature; and determining if the conversion catalyst temperature is less than a pre-regeneration temperature threshold after determining that the average first bucket conversion efficiency is not greater than the first bucket conversion efficiency threshold or the average second bucket conversion efficiency is not greater than the second bucket conversion efficiency threshold.

19. The method of claim 18, further comprising:

determining if the conversion efficiency is greater than a pre-regeneration low temperature conversion efficiency threshold after determining that the conversion catalyst temperature is less than the pre-regeneration temperature threshold;

determining if the conversion efficiency is less than a pre-regeneration high temperature conversion efficiency threshold after determining that the conversion catalyst temperature is greater than the pre-regeneration temperature threshold; and determining if the conversion catalyst temperature is less than a post-regeneration temperature threshold after determining that conversion efficiency is less than the pre-regeneration low temperature conversion efficiency threshold and that the conversion efficiency is greater than the pre-regeneration high temperature conversion efficiency threshold.

20. The method of claim 19, further comprising:

determining if the conversion catalyst temperature is greater than a post-regeneration temperature threshold;

determining if the conversion efficiency is less than a post-regeneration low temperature conversion efficiency threshold after determining that the conversion catalyst temperature is less than the post-regeneration temperature threshold causing the indication device to be in an impure fuel alarm state in response to determining that the conversion efficiency is greater than the post-regeneration low temperature conversion efficiency threshold; and causing the indication device to be in an age alarm state in response to determining that the conversion efficiency is less than the post-regeneration low temperature conversion efficiency threshold.

\* \* \* \* \*